US008128472B1

(12) United States Patent
Lyons et al.

(10) Patent No.: US 8,128,472 B1
(45) Date of Patent: Mar. 6, 2012

(54) POKER TOURNAMENT SYSTEM AND METHOD

(76) Inventors: Charles Clarence Darcy Lyons, Calgary (CA); Roger David Keen, Calgary (CA); Paul Michael Roper, Calgary (CA)

( * ) Notice: Subject to any disclaimer, the term of this patent is extended or adjusted under 35 U.S.C. 154(b) by 0 days.

(21) Appl. No.: 13/087,410

(22) Filed: Apr. 15, 2011

(51) Int. Cl.
*A63F 13/00* (2006.01)
*A63F 1/18* (2006.01)

(52) U.S. Cl. ................ 463/13; 463/16; 463/20; 463/22; 463/25; 273/138.1; 273/292; 273/306; 273/309

(58) Field of Classification Search ............. 463/10–13, 463/16–22, 25–29, 40–42; 273/138.1, 139, 273/142 B, 142 A, 142 J, 148 A, 148 R, 148 B, 273/149 P, 149 R, 274, 292–293, 304, 306, 273/309; *A63F 13/00, 1/18*
See application file for complete search history.

(56) References Cited

U.S. PATENT DOCUMENTS

| | | | | |
|---|---|---|---|---|
| 5,603,502 | A * | 2/1997 | Nakagawa | 273/292 |
| 6,354,592 | B1 * | 3/2002 | Virzi | 273/138.1 |
| 7,094,154 | B2 * | 8/2006 | Kellerman et al. | 463/42 |
| 7,494,410 | B2 * | 2/2009 | Romik | 463/13 |
| 7,516,959 | B2 * | 4/2009 | Huard et al. | 273/274 |
| 7,954,821 | B2 * | 6/2011 | Reabe, Jr. | 273/292 |
| 2004/0235542 | A1 * | 11/2004 | Stronach et al. | 463/6 |
| 2006/0058083 | A1 * | 3/2006 | Crawford et al. | 463/11 |
| 2006/0121971 | A1 * | 6/2006 | Slomiany et al. | 463/16 |
| 2006/0157934 | A1 | 7/2006 | Yoseloff et al. | |
| 2006/0252520 | A1 * | 11/2006 | Platis | 463/28 |
| 2006/0258438 | A1 * | 11/2006 | Platis | 463/25 |
| 2007/0135951 | A1 * | 6/2007 | Romik et al. | 700/91 |
| 2007/0210521 | A1 | 9/2007 | Riolo | |
| 2007/0218968 | A1 * | 9/2007 | Snow et al. | 463/13 |
| 2008/0081682 | A1 * | 4/2008 | Yoshizawa | 463/11 |
| 2008/0113765 | A1 * | 5/2008 | DeWaal | 463/25 |
| 2009/0233716 | A1 | 9/2009 | Cash | |
| 2010/0120519 | A1 * | 5/2010 | Nardizzi et al. | 463/25 |
| 2010/0184508 | A1 * | 7/2010 | Xidos et al. | 463/26 |
| 2010/0210362 | A1 | 8/2010 | Toompere | |
| 2011/0001291 | A1 * | 1/2011 | Dusome et al. | 273/292 |
| 2011/0045909 | A1 * | 2/2011 | Cole | 463/42 |
| 2011/0105208 | A1 * | 5/2011 | Bickley | 463/13 |

* cited by examiner

*Primary Examiner* — Arthur O. Hall
(74) *Attorney, Agent, or Firm* — Dickinson Wright PLLC

(57) ABSTRACT

A method of playing a poker style card game tournament includes providing an original table at which a plurality of players can compete in the poker style card game. An entry fee for each of the plurality of players is predetermined. The type of poker style card game in which the players will compete is predetermined as is an event outcome from which a winner is determined from the plurality of players. A mechanism is provided that allows each of the plurality of players to pay the predetermined entry fee to enter the tournament. A forum is also provided that allows each of the plurality of players to compete against one another in the predetermined poker style card game. A point-leader is identified from amongst the plurality of players based on an evaluation of the event outcome. The point-leader is advanced to one or more additional tables and is compensated based on their performance at the one or more additional tables. At least one stakeholder is also compensated based on the performance of the point-leader at the one or more additional tables.

19 Claims, 20 Drawing Sheets

1000 Person Satellite Format to a Larger "Payout Game"

| Buy-in to satellite game | # of people in $ tournament | generated from satellite games (excluding admin fee) | # of seats to "payout" game | Prize pool left after tickets bought to "payout" game | Number of players that get percentage of winners at "payout" game | Cost of a seat at the "Payout" game |
|---|---|---|---|---|---|---|
| $ 5.00 | 1000 | $ 5,000.00 | 1 | $ 4,000.00 | 8 | $ 1,000.00 |
| $ 10.00 | 1000 | $ 10,000.00 | 2 | $ 8,000.00 | 16 | $ 1,000.00 |
| $ 20.00 | 1000 | $ 20,000.00 | 3 | $ 17,000.00 | 24 | $ 1,000.00 |
| $ 30.00 | 1000 | $ 30,000.00 | 4 | $ 26,000.00 | 32 | $ 1,000.00 |
| $ 40.00 | 1000 | $ 40,000.00 | 5 | $ 35,000.00 | 40 | $ 1,000.00 |
| $ 50.00 | 1000 | $ 50,000.00 | 6 | $ 44,000.00 | 48 | $ 1,000.00 |
| $ 60.00 | 1000 | $ 60,000.00 | 7 | $ 53,000.00 | 56 | $ 1,000.00 |
| $ 70.00 | 1000 | $ 70,000.00 | 8 | $ 62,000.00 | 64 | $ 1,000.00 |
| $ 80.00 | 1000 | $ 80,000.00 | 9 | $ 71,000.00 | 72 | $ 1,000.00 |
| $ 90.00 | 1000 | $ 90,000.00 | 10 | $ 80,000.00 | 80 | $ 1,000.00 |
| $ 100.00 | 1000 | $ 100,000.00 | 11 | $ 89,000.00 | 88 | $ 1,000.00 |

Fig-3A

Denotes a seat winner
Denotes a percentage player

| Tournament buy-in value | | $ 5.00 | $ 10.00 | $ 20.00 | $ 30.00 | $ 40.00 | $ 50.00 | $ 60.00 | $ 70.00 | $ 80.00 | $ 90.00 | $ 100.00 |
|---|---|---|---|---|---|---|---|---|---|---|---|---|
| Prize pool | | $ 4,000.00 | $ 8,000.00 | $ 17,000.00 | $ 26,000.00 | $ 35,000.00 | $ 44,000.00 | $ 53,000.00 | $ 62,000.00 | $ 71,000.00 | $ 80,000.00 | $ 89,000.00 |
| | 1 | $ 600.00 | $ 1,200.00 | $ 2,550.00 | $ 3,900.00 | $ 5,250.00 | $ 6,600.00 | $ 7,950.00 | $ 9,300.00 | $ 10,650.00 | $ 12,000.00 | $ 13,350.00 |
| | 2 | $ 400.00 | $ 800.00 | $ 1,700.00 | $ 2,600.00 | $ 3,500.00 | $ 4,400.00 | $ 5,300.00 | $ 6,200.00 | $ 7,100.00 | $ 8,000.00 | $ 8,900.00 |
| | 3 | $ 280.00 | $ 560.00 | $ 1,190.00 | $ 1,820.00 | $ 2,450.00 | $ 3,080.00 | $ 3,710.00 | $ 4,340.00 | $ 4,970.00 | $ 5,600.00 | $ 6,230.00 |
| | 4 | $ 160.00 | $ 320.00 | $ 680.00 | $ 1,040.00 | $ 1,400.00 | $ 1,760.00 | $ 2,120.00 | $ 2,480.00 | $ 2,840.00 | $ 3,200.00 | $ 3,560.00 |
| | 5 | $ 120.00 | $ 240.00 | $ 510.00 | $ 780.00 | $ 1,050.00 | $ 1,320.00 | $ 1,590.00 | $ 1,860.00 | $ 2,130.00 | $ 2,400.00 | $ 2,670.00 |
| | 6 | $ 90.00 | $ 180.00 | $ 382.50 | $ 585.00 | $ 787.50 | $ 990.00 | $ 1,192.50 | $ 1,395.00 | $ 1,597.50 | $ 1,800.00 | $ 2,002.50 |
| | 7 | $ 70.00 | $ 140.00 | $ 297.50 | $ 455.00 | $ 612.50 | $ 770.00 | $ 927.50 | $ 1,085.00 | $ 1,242.50 | $ 1,400.00 | $ 1,557.50 |
| | 8 | $ 52.00 | $ 104.00 | $ 221.00 | $ 338.00 | $ 455.00 | $ 572.00 | $ 689.00 | $ 806.00 | $ 923.00 | $ 1,040.00 | $ 1,157.00 |
| | 9 | $ 44.00 | $ 88.00 | $ 187.00 | $ 286.00 | $ 385.00 | $ 484.00 | $ 583.00 | $ 682.00 | $ 781.00 | $ 880.00 | $ 979.00 |
| | 10 | $ 42.00 | $ 84.00 | $ 178.50 | $ 273.00 | $ 367.50 | $ 462.00 | $ 556.50 | $ 651.00 | $ 745.50 | $ 840.00 | $ 934.50 |
| | 11 | $ 41.60 | $ 83.20 | $ 176.80 | $ 270.40 | $ 364.00 | $ 457.60 | $ 551.20 | $ 644.80 | $ 738.40 | $ 832.00 | $ 925.60 |
| | 12 | $ 41.20 | $ 82.40 | $ 175.10 | $ 267.80 | $ 360.50 | $ 453.20 | $ 545.90 | $ 638.60 | $ 731.30 | $ 824.00 | $ 916.70 |
| | 13 | $ 40.80 | $ 81.60 | $ 173.40 | $ 265.20 | $ 357.00 | $ 448.80 | $ 540.60 | $ 632.40 | $ 724.20 | $ 816.00 | $ 907.80 |
| | 14 | $ 40.40 | $ 80.80 | $ 171.70 | $ 262.60 | $ 353.50 | $ 444.40 | $ 535.30 | $ 626.20 | $ 717.10 | $ 808.00 | $ 898.90 |
| | 15 | $ 40.00 | $ 80.00 | $ 170.00 | $ 260.00 | $ 350.00 | $ 440.00 | $ 530.00 | $ 620.00 | $ 710.00 | $ 800.00 | $ 890.00 |
| | 16 | $ 39.60 | $ 79.20 | $ 168.30 | $ 257.40 | $ 346.50 | $ 435.60 | $ 524.70 | $ 613.80 | $ 702.90 | $ 792.00 | $ 881.10 |
| | 17 | $ 39.20 | $ 78.40 | $ 166.60 | $ 254.80 | $ 343.00 | $ 431.20 | $ 519.40 | $ 607.60 | $ 695.80 | $ 784.00 | $ 872.20 |
| | 18 | $ 38.80 | $ 77.60 | $ 164.90 | $ 252.20 | $ 339.50 | $ 426.80 | $ 514.10 | $ 601.40 | $ 688.70 | $ 776.00 | $ 863.30 |
| | 19 | $ 38.40 | $ 76.80 | $ 163.20 | $ 249.60 | $ 336.00 | $ 422.40 | $ 508.80 | $ 595.20 | $ 681.60 | $ 768.00 | $ 854.40 |
| | 20 | $ 38.00 | $ 76.00 | $ 161.50 | $ 247.00 | $ 332.50 | $ 418.00 | $ 503.50 | $ 589.00 | $ 674.50 | $ 760.00 | $ 845.50 |
| | 21 | $ 37.60 | $ 75.20 | $ 159.80 | $ 244.40 | $ 329.00 | $ 413.60 | $ 498.20 | $ 582.80 | $ 667.40 | $ 752.00 | $ 836.60 |
| | 22 | $ 37.20 | $ 74.40 | $ 158.10 | $ 241.80 | $ 325.50 | $ 409.20 | $ 492.90 | $ 576.60 | $ 660.30 | $ 744.00 | $ 827.70 |
| | 23 | $ 36.80 | $ 73.60 | $ 156.40 | $ 239.20 | $ 322.00 | $ 404.80 | $ 487.60 | $ 570.40 | $ 653.20 | $ 736.00 | $ 818.80 |
| | 24 | $ 36.40 | $ 72.80 | $ 154.70 | $ 236.60 | $ 318.50 | $ 400.40 | $ 482.30 | $ 564.20 | $ 646.10 | $ 728.00 | $ 809.90 |
| | 25 | $ 36.00 | $ 72.00 | $ 153.00 | $ 234.00 | $ 315.00 | $ 396.00 | $ 477.00 | $ 558.00 | $ 639.00 | $ 720.00 | $ 801.00 |
| | 26 | $ 35.60 | $ 71.20 | $ 151.30 | $ 231.40 | $ 311.50 | $ 391.60 | $ 471.70 | $ 551.80 | $ 631.90 | $ 712.00 | $ 792.10 |
| | 27 | $ 35.20 | $ 70.40 | $ 149.60 | $ 228.80 | $ 308.00 | $ 387.20 | $ 466.40 | $ 545.60 | $ 624.80 | $ 704.00 | $ 783.20 |
| | 28 | $ 34.80 | $ 69.60 | $ 147.90 | $ 226.20 | $ 304.50 | $ 382.80 | $ 461.10 | $ 539.40 | $ 617.70 | $ 696.00 | $ 774.30 |
| | 29 | $ 34.40 | $ 68.80 | $ 146.20 | $ 223.60 | $ 301.00 | $ 378.40 | $ 455.80 | $ 533.20 | $ 610.60 | $ 688.00 | $ 765.40 |
| | 30 | $ 34.00 | $ 68.00 | $ 144.50 | $ 221.00 | $ 297.50 | $ 374.00 | $ 450.50 | $ 527.00 | $ 603.50 | $ 680.00 | $ 756.50 |

Fig-3C —(A)

| | | | | | | | | | | | |
|---|---|---|---|---|---|---|---|---|---|---|---|
| 31 | $ 33.60 | $ 67.20 | $ 142.80 | $ 218.40 | $ 294.00 | $ 369.60 | $ 445.20 | $ 520.80 | $ 596.40 | $ 672.00 | $ 747.60 |
| 32 | $ 33.20 | $ 66.40 | $ 141.10 | $ 215.80 | $ 290.50 | $ 365.20 | $ 439.90 | $ 514.60 | $ 589.30 | $ 664.00 | $ 738.70 |
| 33 | $ 32.80 | $ 65.60 | $ 139.40 | $ 213.20 | $ 287.00 | $ 360.80 | $ 434.60 | $ 508.40 | $ 582.20 | $ 656.00 | $ 729.80 |
| 34 | $ 32.40 | $ 64.80 | $ 137.70 | $ 210.60 | $ 283.50 | $ 356.40 | $ 429.30 | $ 502.20 | $ 575.10 | $ 648.00 | $ 720.90 |
| 35 | $ 32.00 | $ 64.00 | $ 136.00 | $ 208.00 | $ 280.00 | $ 352.00 | $ 424.00 | $ 496.00 | $ 568.00 | $ 640.00 | $ 712.00 |
| 36 | $ 31.60 | $ 63.20 | $ 134.30 | $ 205.40 | $ 276.50 | $ 347.60 | $ 418.70 | $ 489.80 | $ 560.90 | $ 632.00 | $ 703.10 |
| 37 | $ 31.20 | $ 62.40 | $ 132.60 | $ 202.80 | $ 273.00 | $ 343.20 | $ 413.40 | $ 483.60 | $ 553.80 | $ 624.00 | $ 694.20 |
| 38 | $ 30.80 | $ 61.60 | $ 130.90 | $ 200.20 | $ 269.50 | $ 338.80 | $ 408.10 | $ 477.40 | $ 546.70 | $ 616.00 | $ 685.30 |
| 39 | $ 30.40 | $ 60.80 | $ 129.20 | $ 197.60 | $ 266.00 | $ 334.40 | $ 402.80 | $ 471.20 | $ 539.60 | $ 608.00 | $ 676.40 |
| 40 | $ 30.00 | $ 60.00 | $ 127.50 | $ 195.00 | $ 262.50 | $ 330.00 | $ 397.50 | $ 465.00 | $ 532.50 | $ 600.00 | $ 667.50 |
| 41 | $ 29.60 | $ 59.20 | $ 125.80 | $ 192.40 | $ 259.00 | $ 325.60 | $ 392.20 | $ 458.80 | $ 525.40 | $ 592.00 | $ 658.60 |
| 42 | $ 29.20 | $ 58.40 | $ 124.10 | $ 189.80 | $ 255.50 | $ 321.20 | $ 386.90 | $ 452.60 | $ 518.30 | $ 584.00 | $ 649.70 |
| 43 | $ 28.80 | $ 57.60 | $ 122.40 | $ 187.20 | $ 252.00 | $ 316.80 | $ 381.60 | $ 446.40 | $ 511.20 | $ 576.00 | $ 640.80 |
| 44 | $ 28.40 | $ 56.80 | $ 120.70 | $ 184.60 | $ 248.50 | $ 312.40 | $ 376.30 | $ 440.20 | $ 504.10 | $ 568.00 | $ 631.90 |
| 45 | $ 28.00 | $ 56.00 | $ 119.00 | $ 182.00 | $ 245.00 | $ 308.00 | $ 371.00 | $ 434.00 | $ 497.00 | $ 560.00 | $ 623.00 |
| 46 | $ 27.60 | $ 55.20 | $ 117.30 | $ 179.40 | $ 241.50 | $ 303.60 | $ 365.70 | $ 427.80 | $ 489.90 | $ 552.00 | $ 614.10 |
| 47 | $ 27.20 | $ 54.40 | $ 115.60 | $ 176.80 | $ 238.00 | $ 299.20 | $ 360.40 | $ 421.60 | $ 482.80 | $ 544.00 | $ 605.20 |
| 48 | $ 26.80 | $ 53.60 | $ 113.90 | $ 174.20 | $ 234.50 | $ 294.80 | $ 355.10 | $ 415.40 | $ 475.70 | $ 536.00 | $ 596.30 |
| 49 | $ 26.40 | $ 52.80 | $ 112.20 | $ 171.60 | $ 231.00 | $ 290.40 | $ 349.80 | $ 409.20 | $ 468.60 | $ 528.00 | $ 587.40 |
| 50 | $ 26.00 | $ 52.00 | $ 110.50 | $ 169.00 | $ 227.50 | $ 286.00 | $ 344.50 | $ 403.00 | $ 461.50 | $ 520.00 | $ 578.50 |
| 51 | $ 25.60 | $ 51.20 | $ 108.80 | $ 166.40 | $ 224.00 | $ 281.60 | $ 339.20 | $ 396.80 | $ 454.40 | $ 512.00 | $ 569.60 |
| 52 | $ 25.20 | $ 50.40 | $ 107.10 | $ 163.80 | $ 220.50 | $ 277.20 | $ 333.90 | $ 390.60 | $ 447.30 | $ 504.00 | $ 560.70 |
| 53 | $ 24.80 | $ 49.60 | $ 105.40 | $ 161.20 | $ 217.00 | $ 272.80 | $ 328.60 | $ 384.40 | $ 440.20 | $ 496.00 | $ 551.80 |
| 54 | $ 24.40 | $ 48.80 | $ 103.70 | $ 158.60 | $ 213.50 | $ 268.40 | $ 323.30 | $ 378.20 | $ 433.10 | $ 488.00 | $ 542.90 |
| 55 | $ 24.00 | $ 48.00 | $ 102.00 | $ 156.00 | $ 210.00 | $ 264.00 | $ 318.00 | $ 372.00 | $ 426.00 | $ 480.00 | $ 534.00 |
| 56 | $ 23.60 | $ 47.20 | $ 100.30 | $ 153.40 | $ 206.50 | $ 259.60 | $ 312.70 | $ 365.80 | $ 418.90 | $ 472.00 | $ 525.10 |
| 57 | $ 23.20 | $ 46.40 | $ 98.60 | $ 150.80 | $ 203.00 | $ 255.20 | $ 307.40 | $ 359.60 | $ 411.80 | $ 464.00 | $ 516.20 |
| 58 | $ 22.80 | $ 45.60 | $ 96.90 | $ 148.20 | $ 199.50 | $ 250.80 | $ 302.10 | $ 353.40 | $ 404.70 | $ 456.00 | $ 507.30 |
| 59 | $ 22.40 | $ 44.80 | $ 95.20 | $ 145.60 | $ 196.00 | $ 246.40 | $ 296.80 | $ 347.20 | $ 397.60 | $ 448.00 | $ 498.40 |
| 60 | $ 22.00 | $ 44.00 | $ 93.50 | $ 143.00 | $ 192.50 | $ 242.00 | $ 291.50 | $ 341.00 | $ 390.50 | $ 440.00 | $ 489.50 |
| 61 | $ 21.60 | $ 43.20 | $ 91.80 | $ 140.40 | $ 189.00 | $ 237.60 | $ 286.20 | $ 334.80 | $ 383.40 | $ 432.00 | $ 480.60 |
| 62 | $ 21.20 | $ 42.40 | $ 90.10 | $ 137.80 | $ 185.50 | $ 233.20 | $ 280.90 | $ 328.60 | $ 376.30 | $ 424.00 | $ 471.70 |
| 63 | $ 20.80 | $ 41.60 | $ 88.40 | $ 135.20 | $ 182.00 | $ 228.80 | $ 275.60 | $ 322.40 | $ 369.20 | $ 416.00 | $ 462.80 |
| 64 | $ 20.40 | $ 40.80 | $ 86.70 | $ 132.60 | $ 178.50 | $ 224.40 | $ 270.30 | $ 316.20 | $ 362.10 | $ 408.00 | $ 453.90 |
| 65 | $ 20.00 | $ 40.00 | $ 85.00 | $ 130.00 | $ 175.00 | $ 220.00 | $ 265.00 | $ 310.00 | $ 355.00 | $ 400.00 | $ 445.00 |

Fig-3C — B

| | | | | | | | | | | | |
|---|---|---|---|---|---|---|---|---|---|---|---|
| 66 | $ 19.60 | $ 39.20 | $ 83.30 | $ 127.40 | $ 171.50 | $ 215.60 | $ 259.70 | $ 303.80 | $ 347.90 | $ 392.00 | $ 436.10 |
| 67 | $ 19.20 | $ 38.40 | $ 81.60 | $ 124.80 | $ 168.00 | $ 211.20 | $ 254.40 | $ 297.60 | $ 340.80 | $ 384.00 | $ 427.20 |
| 68 | $ 18.80 | $ 37.60 | $ 79.90 | $ 122.20 | $ 164.50 | $ 206.80 | $ 249.10 | $ 291.40 | $ 333.70 | $ 376.00 | $ 418.30 |
| 69 | $ 18.40 | $ 36.80 | $ 78.20 | $ 119.60 | $ 161.00 | $ 202.40 | $ 243.80 | $ 285.20 | $ 326.60 | $ 368.00 | $ 409.40 |
| 70 | $ 18.00 | $ 36.00 | $ 76.50 | $ 117.00 | $ 157.50 | $ 198.00 | $ 238.50 | $ 279.00 | $ 319.50 | $ 360.00 | $ 400.50 |
| 71 | $ 17.60 | $ 35.20 | $ 74.80 | $ 114.40 | $ 154.00 | $ 193.60 | $ 233.20 | $ 272.60 | $ 312.40 | $ 352.00 | $ 391.60 |
| 72 | $ 17.20 | $ 34.40 | $ 73.10 | $ 111.80 | $ 150.50 | $ 189.20 | $ 227.90 | $ 266.60 | $ 305.30 | $ 344.00 | $ 382.70 |
| 73 | $ 16.80 | $ 33.60 | $ 71.40 | $ 109.20 | $ 147.00 | $ 184.80 | $ 222.60 | $ 260.40 | $ 298.20 | $ 336.00 | $ 373.80 |
| 74 | $ 16.40 | $ 32.80 | $ 69.70 | $ 106.60 | $ 143.50 | $ 180.40 | $ 217.30 | $ 254.20 | $ 291.10 | $ 328.00 | $ 364.90 |
| 75 | $ 16.00 | $ 32.00 | $ 68.00 | $ 104.00 | $ 140.00 | $ 176.00 | $ 212.00 | $ 248.00 | $ 284.00 | $ 320.00 | $ 356.00 |
| 76 | $ 15.60 | $ 31.20 | $ 66.30 | $ 101.40 | $ 136.50 | $ 171.60 | $ 206.70 | $ 241.80 | $ 276.90 | $ 312.00 | $ 347.10 |
| 77 | $ 15.20 | $ 30.40 | $ 64.60 | $ 98.80 | $ 133.00 | $ 167.20 | $ 201.40 | $ 235.60 | $ 269.80 | $ 304.00 | $ 338.20 |
| 78 | $ 14.80 | $ 29.60 | $ 62.90 | $ 96.20 | $ 129.50 | $ 162.80 | $ 196.10 | $ 229.40 | $ 262.70 | $ 296.00 | $ 329.30 |
| 79 | $ 14.40 | $ 28.80 | $ 61.20 | $ 93.60 | $ 126.00 | $ 158.40 | $ 190.80 | $ 223.20 | $ 255.60 | $ 288.00 | $ 320.40 |
| 80 | $ 14.00 | $ 28.00 | $ 59.50 | $ 91.00 | $ 122.50 | $ 154.00 | $ 185.50 | $ 217.00 | $ 248.50 | $ 280.00 | $ 311.50 |
| 81 | $ 13.60 | $ 27.20 | $ 57.80 | $ 88.40 | $ 119.00 | $ 149.60 | $ 180.20 | $ 210.80 | $ 241.40 | $ 272.00 | $ 302.60 |
| 82 | $ 13.20 | $ 26.40 | $ 56.10 | $ 85.80 | $ 115.50 | $ 145.20 | $ 174.90 | $ 204.60 | $ 234.30 | $ 264.00 | $ 293.70 |
| 83 | $ 12.80 | $ 25.60 | $ 54.40 | $ 83.20 | $ 112.00 | $ 140.80 | $ 169.60 | $ 198.40 | $ 227.20 | $ 256.00 | $ 284.80 |
| 84 | $ 12.40 | $ 24.80 | $ 52.70 | $ 80.60 | $ 108.50 | $ 136.40 | $ 164.30 | $ 192.20 | $ 220.10 | $ 248.00 | $ 275.90 |
| 85 | $ 12.00 | $ 24.00 | $ 51.00 | $ 78.00 | $ 105.00 | $ 132.00 | $ 159.00 | $ 186.00 | $ 213.00 | $ 240.00 | $ 267.00 |
| 86 | $ 11.60 | $ 23.20 | $ 49.30 | $ 75.40 | $ 101.50 | $ 127.60 | $ 153.70 | $ 179.80 | $ 205.90 | $ 232.00 | $ 258.10 |
| 87 | $ 11.20 | $ 22.40 | $ 47.60 | $ 72.80 | $ 98.00 | $ 123.20 | $ 148.40 | $ 173.60 | $ 198.80 | $ 224.00 | $ 249.20 |
| 88 | $ 10.80 | $ 21.60 | $ 45.90 | $ 70.20 | $ 94.50 | $ 118.80 | $ 143.10 | $ 167.40 | $ 191.70 | $ 216.00 | $ 240.30 |
| 89 | $ 10.40 | $ 20.80 | $ 44.20 | $ 67.60 | $ 91.00 | $ 114.40 | $ 137.80 | $ 161.20 | $ 184.60 | $ 208.00 | $ 231.40 |
| 90 | $ 10.00 | $ 20.00 | $ 42.50 | $ 65.00 | $ 87.50 | $ 110.00 | $ 132.50 | $ 155.00 | $ 177.50 | $ 200.00 | $ 222.50 |
| 91 | $ 9.60 | $ 19.20 | $ 40.80 | $ 62.40 | $ 84.00 | $ 105.60 | $ 127.20 | $ 148.80 | $ 170.40 | $ 192.00 | $ 213.60 |
| 92 | $ 9.20 | $ 18.40 | $ 39.10 | $ 59.80 | $ 80.50 | $ 101.20 | $ 121.90 | $ 142.60 | $ 163.30 | $ 184.00 | $ 204.70 |
| 93 | $ 8.80 | $ 17.60 | $ 37.40 | $ 57.20 | $ 77.00 | $ 96.80 | $ 116.60 | $ 136.40 | $ 156.20 | $ 176.00 | $ 195.80 |
| 94 | $ 8.40 | $ 16.80 | $ 35.70 | $ 54.60 | $ 73.50 | $ 92.40 | $ 111.30 | $ 130.20 | $ 149.10 | $ 168.00 | $ 186.90 |
| 95 | $ 8.00 | $ 16.00 | $ 34.00 | $ 52.00 | $ 70.00 | $ 88.00 | $ 106.00 | $ 124.00 | $ 142.00 | $ 160.00 | $ 178.00 |
| 96 | $ 7.60 | $ 15.20 | $ 32.30 | $ 49.40 | $ 66.50 | $ 83.60 | $ 100.70 | $ 117.80 | $ 134.90 | $ 152.00 | $ 169.10 |
| 97 | $ 7.20 | $ 14.40 | $ 30.60 | $ 46.80 | $ 63.00 | $ 79.20 | $ 95.40 | $ 111.60 | $ 127.80 | $ 144.00 | $ 160.20 |
| 98 | $ 6.80 | $ 13.60 | $ 28.90 | $ 44.20 | $ 59.50 | $ 74.80 | $ 90.10 | $ 105.40 | $ 120.70 | $ 136.00 | $ 151.30 |
| 99 | $ 6.40 | $ 12.80 | $ 27.20 | $ 41.60 | $ 56.00 | $ 70.40 | $ 84.80 | $ 99.20 | $ 113.60 | $ 128.00 | $ 142.40 |
| 100 | $ 6.00 | $ 12.00 | $ 25.50 | $ 39.00 | $ 52.50 | $ 66.00 | $ 79.50 | $ 93.00 | $ 106.50 | $ 120.00 | $ 133.50 |
| | $ 4,000.00 | $ 8,000.00 | $17,000.00 | $ 26,000.00 | $ 35,000.00 | $ 44,000.00 | $53,000.00 | $ 62,000.00 | $71,000.00 | $ 80,000.00 | $ 89,000.00 |

Fig-3C —(C)

Example of a buy-in chart to a one table satellite (sit and go)

| Buy-in to satellite game with one seat going to the main event | # of people in tournament | $ generated from the satellite game excluding the 10% admin fee | # of seats to the "payout" event | Cost of a seat at the "payout" event |
|---|---|---|---|---|
| $5.00 | 10 | $50.00 | 1 | $50.00 |
| $10.00 | 10 | $100.00 | 1 | $100.00 |
| $20.00 | 10 | $200.00 | 1 | $200.00 |
| $30.00 | 10 | $300.00 | 1 | $300.00 |
| $40.00 | 10 | $400.00 | 1 | $400.00 |
| $50.00 | 10 | $500.00 | 1 | $500.00 |
| $60.00 | 10 | $600.00 | 1 | $600.00 |
| $70.00 | 10 | $700.00 | 1 | $700.00 |
| $80.00 | 10 | $800.00 | 1 | $800.00 |
| $90.00 | 10 | $900.00 | 1 | $900.00 |
| $100.00 | 10 | $1,000.00 | 1 | $1,000.00 |

Fig-4A

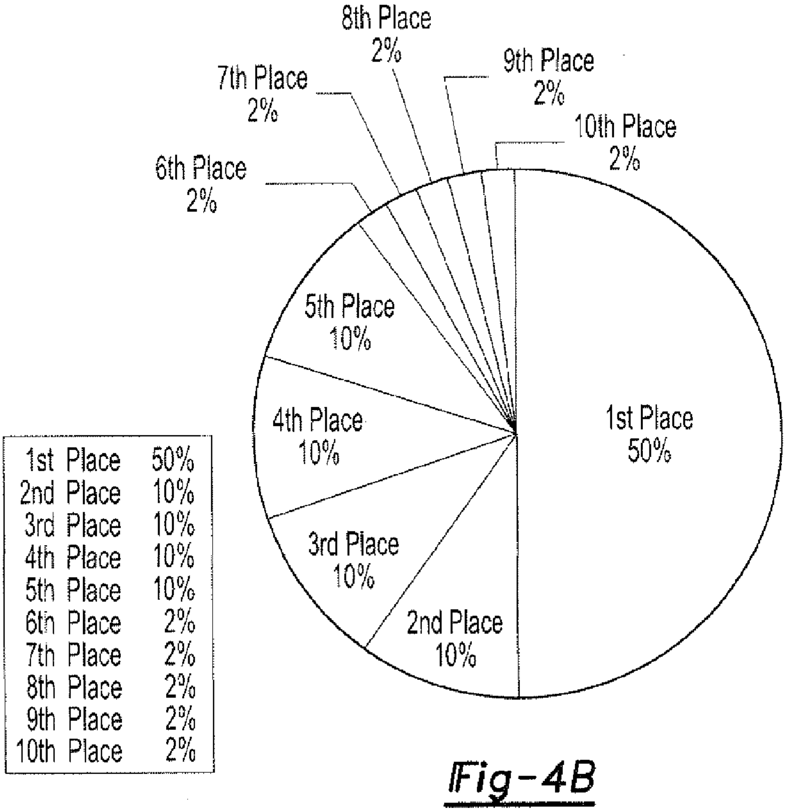

| | |
|---|---|
| 1st Place | 50% |
| 2nd Place | 10% |
| 3rd Place | 10% |
| 4th Place | 10% |
| 5th Place | 10% |
| 6th Place | 2% |
| 7th Place | 2% |
| 8th Place | 2% |
| 9th Place | 2% |
| 10th Place | 2% |

Fig-4B

Example of a buy-in chart to a one table satellite with two seats going forward

| Buy-in to satellite game with one seat going to the main event | # of people in tournament | $ generated from the satellite game excluding the 10% admin fee | # of seats to the "payout" event | Cost of a seat at the "payout" event |
|---|---|---|---|---|
| $10.00 | 10 | $100.00 | 2 | $50.00 |
| $20.00 | 10 | $200.00 | 2 | $100.00 |
| $40.00 | 10 | $400.00 | 2 | $200.00 |
| $60.00 | 10 | $600.00 | 2 | $300.00 |
| $80.00 | 10 | $800.00 | 2 | $400.00 |
| $100.00 | 10 | $1,000.00 | 2 | $500.00 |
| $120.00 | 10 | $1,200.00 | 2 | $600.00 |
| $140.00 | 10 | $1,400.00 | 2 | $700.00 |
| $160.00 | 10 | $1,600.00 | 2 | $800.00 |
| $180.00 | 10 | $1,800.00 | 2 | $900.00 |
| $200.00 | 10 | $2,000.00 | 2 | $1,000.00 |

Example of a buy-in chart to a one table satellite with three seats going forward

| Buy-in to satellite game with one seat going to the main event | # of people in tournament | $ generated from the satellite game excluding the 10% admin fee | # of seats to the "payout" event | Cost of a seat at the "payout" event |
|---|---|---|---|---|
| $15.00 | 10 | $150.00 | 3 | $50.00 |
| $30.00 | 10 | $300.00 | 3 | $100.00 |
| $60.00 | 10 | $600.00 | 3 | $200.00 |
| $90.00 | 10 | $900.00 | 3 | $300.00 |
| $120.00 | 10 | $1,200.00 | 3 | $400.00 |
| $150.00 | 10 | $1,500.00 | 3 | $500.00 |
| $180.00 | 10 | $1,800.00 | 3 | $600.00 |
| $210.00 | 10 | $2,100.00 | 3 | $700.00 |
| $240.00 | 10 | $2,400.00 | 3 | $800.00 |
| $270.00 | 10 | $2,700.00 | 3 | $900.00 |
| $300.00 | 10 | $3,000.00 | 3 | $1,000.00 |

Example of a buy-in chart to a one table satellite with four seats going forward

| Buy-in to satellite game with one seat going to the main event | # of people in tournament | $ generated from the satellite game excluding the 10% admin fee | # of seats to the "payout" event | Cost of a seat at the "payout" event |
|---|---|---|---|---|
| $20.00 | 10 | $200.00 | 4 | $50.00 |
| $40.00 | 10 | $400.00 | 4 | $100.00 |
| $80.00 | 10 | $800.00 | 4 | $200.00 |
| $120.00 | 10 | $1,200.00 | 4 | $300.00 |
| $160.00 | 10 | $1,600.00 | 4 | $400.00 |
| $200.00 | 10 | $2,000.00 | 4 | $500.00 |
| $240.00 | 10 | $2,400.00 | 4 | $600.00 |
| $280.00 | 10 | $2,800.00 | 4 | $700.00 |
| $320.00 | 10 | $3,200.00 | 4 | $800.00 |
| $360.00 | 10 | $3,600.00 | 4 | $900.00 |
| $400.00 | 10 | $4,000.00 | 4 | $1,000.00 |

Example of a buy-in chart to a one table satellite with five seats going forward

| Buy-in to satellite game with one seat going to the main event | # of people in tournament | $ generated from the satellite game excluding the 10% admin fee | # of seats to the "payout" event | Cost of a seat at the "payout" event |
|---|---|---|---|---|
| $25.00 | 10 | $250.00 | 5 | $50.00 |
| $50.00 | 10 | $500.00 | 5 | $100.00 |
| $100.00 | 10 | $1,000.00 | 5 | $200.00 |
| $150.00 | 10 | $1,500.00 | 5 | $300.00 |
| $200.00 | 10 | $2,000.00 | 5 | $400.00 |
| $250.00 | 10 | $2,500.00 | 5 | $500.00 |
| $300.00 | 10 | $3,000.00 | 5 | $600.00 |
| $350.00 | 10 | $3,500.00 | 5 | $700.00 |
| $400.00 | 10 | $4,000.00 | 5 | $800.00 |
| $450.00 | 10 | $4,500.00 | 5 | $900.00 |
| $500.00 | 10 | $5,000.00 | 5 | $1,000.00 |

Fig-8A

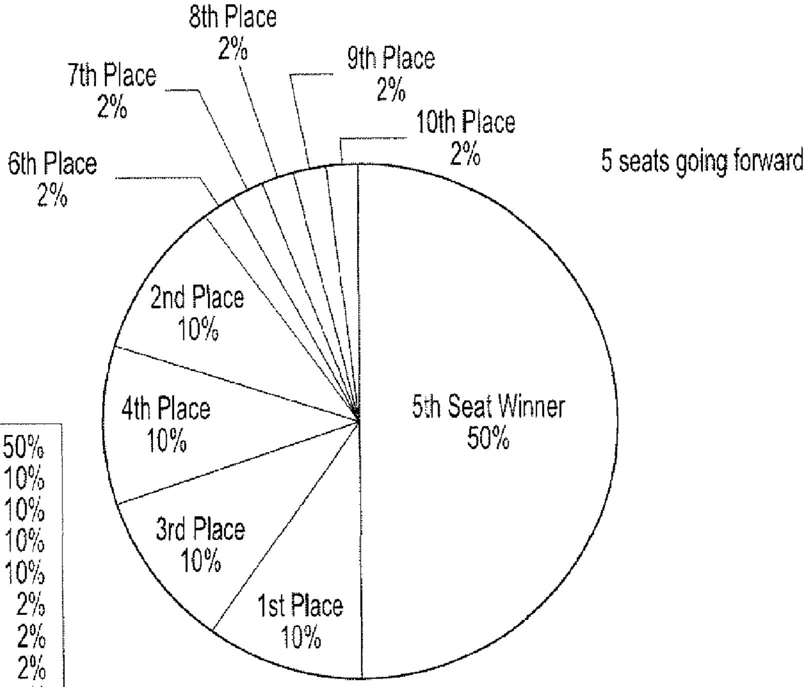

| | |
|---|---|
| 5th Place | 50% |
| 1st Place | 10% |
| 3rd Place | 10% |
| 4th Place | 10% |
| 2nd Place | 10% |
| 6th Place | 2% |
| 7th Place | 2% |
| 8th Place | 2% |
| 9th Place | 2% |
| 10th Place | 2% |

Fig-8B

The following table represents the final table percentage payout at a money event for seat values from $50.00-$1,000.00, the values shown is what would be distributed back to the original sit and go table that got the player to the money event

| | | | | | | | | | | | | |
|---|---|---|---|---|---|---|---|---|---|---|---|---|
| Money Event Tournament buy-in value | | $ 50.00 | $ 100.00 | $ 200.00 | $ 300.00 | $ 400.00 | $ 500.00 | $ 600.00 | $ 700.00 | $ 800.00 | $ 900.00 | $ 1,000.00 |
| Prize pool | | $50,000.00 | $100,000.00 | $200,000.00 | $300,000.00 | $400,000.00 | $500,000.00 | $600,000.00 | $700,000.00 | $800,000.00 | $900,000.00 | $1,000,000.00 |
| # of Players in the tournament | | 1,000 | 1,000 | 1,000 | 1,000 | 1,000 | 1,000 | 1,000 | 1,000 | 1,000 | 1,000 | 1,000 |
| | 1 | $25,000.00 | $ 50,000.00 | $100,000.00 | $150,000.00 | $200,000.00 | $250,000.00 | $300,000.00 | $350,000.00 | $400,000.00 | $450,000.00 | $ 500,000.00 |
| | 2 | $ 5,000.00 | $ 10,000.00 | $ 20,000.00 | $ 30,000.00 | $ 40,000.00 | $ 50,000.00 | $ 60,000.00 | $ 70,000.00 | $ 80,000.00 | $ 90,000.00 | $ 100,000.00 |
| | 3 | $ 5,000.00 | $ 10,000.00 | $ 20,000.00 | $ 30,000.00 | $ 40,000.00 | $ 50,000.00 | $ 60,000.00 | $ 70,000.00 | $ 80,000.00 | $ 90,000.00 | $ 100,000.00 |
| | 4 | $ 5,000.00 | $ 10,000.00 | $ 20,000.00 | $ 30,000.00 | $ 40,000.00 | $ 50,000.00 | $ 60,000.00 | $ 70,000.00 | $ 80,000.00 | $ 90,000.00 | $ 100,000.00 |
| | 5 | $ 5,000.00 | $ 10,000.00 | $ 20,000.00 | $ 30,000.00 | $ 40,000.00 | $ 50,000.00 | $ 60,000.00 | $ 70,000.00 | $ 80,000.00 | $ 90,000.00 | $ 100,000.00 |
| | 6 | $ 1,000.00 | $ 2,000.00 | $ 4,000.00 | $ 6,000.00 | $ 8,000.00 | $ 10,000.00 | $ 12,000.00 | $ 14,000.00 | $ 16,000.00 | $ 18,000.00 | $ 20,000.00 |
| | 7 | $ 1,000.00 | $ 2,000.00 | $ 4,000.00 | $ 6,000.00 | $ 8,000.00 | $ 10,000.00 | $ 12,000.00 | $ 14,000.00 | $ 16,000.00 | $ 18,000.00 | $ 20,000.00 |
| | 8 | $ 1,000.00 | $ 2,000.00 | $ 4,000.00 | $ 6,000.00 | $ 8,000.00 | $ 10,000.00 | $ 12,000.00 | $ 14,000.00 | $ 16,000.00 | $ 18,000.00 | $ 20,000.00 |
| | 9 | $ 1,000.00 | $ 2,000.00 | $ 4,000.00 | $ 6,000.00 | $ 8,000.00 | $ 10,000.00 | $ 12,000.00 | $ 14,000.00 | $ 16,000.00 | $ 18,000.00 | $ 20,000.00 |
| | 10 | $ 1,000.00 | $ 2,000.00 | $ 4,000.00 | $ 6,000.00 | $ 8,000.00 | $ 10,000.00 | $ 12,000.00 | $ 14,000.00 | $ 16,000.00 | $ 18,000.00 | $ 20,000.00 |

Fig-9

The table below represents a sample of a 1000 person cash shoot out format

| | | | | | | | | | | | |
|---|---|---|---|---|---|---|---|---|---|---|---|
| Tournament buy-in value | | $ 5.00 | $ 10.00 | $ 20.00 | $ 30.00 | $ 40.00 | $ 50.00 | $ 60.00 | $ 70.00 | $ 80.00 | $ 90.00 | $ 100.00 |
| Prize pool | | $ 5,000.00 | $ 10,000.00 | $ 20,000.00 | $ 30,000.00 | $ 40,000.00 | $ 50,000.00 | $ 60,000.00 | $ 70,000.00 | $ 80,000.00 | $ 90,000.00 | $ 100,000.00 |
| # of Players in the tournament | | 1,000 | 1,000 | 1,000 | 1,000 | 1,000 | 1,000 | 1,000 | 1,000 | 1,000 | 1,000 | 1,000 |
| | 1 | $ 2,000.00 | $ 4,000.00 | $ 8,000.00 | $ 12,000.00 | $ 16,000.00 | $ 20,000.00 | $ 24,000.00 | $ 28,000.00 | $ 32,000.00 | $ 36,000.00 | $ 40,000.00 |
| | 2 | $ 1,000.00 | $ 2,000.00 | $ 4,000.00 | $ 6,000.00 | $ 8,000.00 | $ 10,000.00 | $ 12,000.00 | $ 14,000.00 | $ 16,000.00 | $ 18,000.00 | $ 20,000.00 |
| | 3 | $ 400.00 | $ 800.00 | $ 1,600.00 | $ 2,400.00 | $ 3,200.00 | $ 4,000.00 | $ 4,800.00 | $ 5,600.00 | $ 6,400.00 | $ 7,200.00 | $ 8,000.00 |
| | 4 | $ 350.00 | $ 700.00 | $ 1,400.00 | $ 2,100.00 | $ 2,800.00 | $ 3,500.00 | $ 4,200.00 | $ 4,900.00 | $ 5,600.00 | $ 6,300.00 | $ 7,000.00 |
| | 5 | $ 300.00 | $ 600.00 | $ 1,200.00 | $ 1,800.00 | $ 2,400.00 | $ 3,000.00 | $ 3,600.00 | $ 4,200.00 | $ 4,800.00 | $ 5,400.00 | $ 6,000.00 |
| | 6 | $ 250.00 | $ 500.00 | $ 1,000.00 | $ 1,500.00 | $ 2,000.00 | $ 2,500.00 | $ 3,000.00 | $ 3,500.00 | $ 4,000.00 | $ 4,500.00 | $ 5,000.00 |
| | 7 | $ 250.00 | $ 500.00 | $ 1,000.00 | $ 1,500.00 | $ 2,000.00 | $ 2,500.00 | $ 3,000.00 | $ 3,500.00 | $ 4,000.00 | $ 4,500.00 | $ 5,000.00 |
| | 8 | $ 150.00 | $ 300.00 | $ 600.00 | $ 900.00 | $ 1,200.00 | $ 1,500.00 | $ 1,800.00 | $ 2,100.00 | $ 2,400.00 | $ 2,700.00 | $ 3,000.00 |
| | 9 | $ 150.00 | $ 300.00 | $ 600.00 | $ 900.00 | $ 1,200.00 | $ 1,500.00 | $ 1,800.00 | $ 2,100.00 | $ 2,400.00 | $ 2,700.00 | $ 3,000.00 |
| | 10 | $ 150.00 | $ 300.00 | $ 600.00 | $ 900.00 | $ 1,200.00 | $ 1,500.00 | $ 1,800.00 | $ 2,100.00 | $ 2,400.00 | $ 2,700.00 | $ 3,000.00 |

Fig-10B

| | | | | | | | | | | | | |
|---|---|---|---|---|---|---|---|---|---|---|---|---|
| Tournament buy-in value | | $ 5.00 | The amount that goes back to the original table in the satellite event | $ 10.00 | The amount that goes back to the original table in the satellite event | $ 20.00 | The amount that goes back to the original table in the satellite event | $ 30.00 | The amount that goes back to the original table in the satellite event | $ 40.00 | The amount that goes back to the original table in the satellite event | $ 50.00 | The amount that goes back to the original table in the satellite event |
| Prize pool | | $ 5,000.00 | | $10,000.00 | | $20,000.00 | | $30,000.00 | | $40,000.00 | | $50,000.00 | |
| # of Players in the tournament | | 1,000 | | 1,000 | | 1,000 | | 1,000 | | 1,000 | | 1,000 | |
| | 1 | $ 2,000.00 | $ 200.00 | $ 4,000.00 | $400.00 | $ 8,000.00 | $ 800.00 | $12,000.00 | $ 1,200.00 | $16,000.00 | $1,600.00 | $20,000.00 | $2,000.00 |
| | 2 | $ 1,000.00 | $ 100.00 | $ 2,000.00 | $ 200.00 | $ 4,000.00 | $ 400.00 | $ 6,000.00 | $ 600.00 | $ 8,000.00 | $ 800.00 | $10,000.00 | $1,000.00 |
| | 3 | $ 400.00 | $ 40.00 | $ 800.00 | $ 80.00 | $ 1,600.00 | $ 160.00 | $ 2,400.00 | $ 240.00 | $ 3,200.00 | $ 320.00 | $ 4,000.00 | $ 400.00 |
| | 4 | $ 350.00 | $ 35.00 | $ 700.00 | $ 70.00 | $ 1,400.00 | $ 140.00 | $ 2,100.00 | $ 210.00 | $ 2,800.00 | $ 280.00 | $ 3,500.00 | $ 350.00 |
| | 5 | $ 300.00 | $ 30.00 | $ 600.00 | $ 60.00 | $ 1,200.00 | $ 120.00 | $ 1,800.00 | $ 180.00 | $ 2,400.00 | $ 240.00 | $ 3,000.00 | $ 300.00 |
| | 6 | $ 250.00 | $ 25.00 | $ 500.00 | $ 50.00 | $ 1,000.00 | $ 100.00 | $ 1,500.00 | $ 150.00 | $ 2,000.00 | $ 200.00 | $ 2,500.00 | $ 250.00 |
| | 7 | $ 250.00 | $ 25.00 | $ 500.00 | $ 50.00 | $ 1,000.00 | $ 100.00 | $ 1,500.00 | $ 150.00 | $ 2,000.00 | $ 200.00 | $ 2,500.00 | $ 250.00 |
| | 8 | $ 150.00 | $ 15.00 | $ 300.00 | $ 30.00 | $ 600.00 | $ 60.00 | $ 900.00 | $ 90.00 | $ 1,200.00 | $ 120.00 | $ 1,500.00 | $ 150.00 |
| | 9 | $ 150.00 | $ 15.00 | $ 300.00 | $ 30.00 | $ 600.00 | $ 60.00 | $ 900.00 | $ 90.00 | $ 1,200.00 | $ 120.00 | $ 1,500.00 | $ 150.00 |
| | 10 | $ 150.00 | $ 15.00 | $ 300.00 | $ 30.00 | $ 600.00 | $ 60.00 | $ 900.00 | $ 90.00 | $ 1,200.00 | $ 120.00 | $ 1,500.00 | $ 150.00 |

| | | | | | | | | | | | |
|---|---|---|---|---|---|---|---|---|---|---|---|
| Tournament buy-in value | | $ 60.00 | The amount that goes back to the original table in the satellite event | $ 70.00 | The amount that goes back to the original table in the satellite event | $ 80.00 | The amount that goes back to the original table in the satellite event | $ 90.00 | The amount that goes back to the original table in the satellite event | $ 100.00 | The amount that goes back to the original table in the satellite event |
| Prize pool | | $60,000.00 | | $70,000.00 | | $80,000.00 | | $90,000.00 | | $100,000.00 | |
| # of Players in the tournament | | 1,000 | | 1,000 | | 1,000 | | 1,000 | | 1,000 | |
| | 1 | $24,000.00 | $ 2,400.00 | $28,000.00 | $ 2,800.00 | $32,000.00 | $3,200.00 | $36,000.00 | $3,600.00 | $ 40,000.00 | $4,000.00 |
| | 2 | $12,000.00 | $ 1,200.00 | $14,000.00 | $ 1,400.00 | $16,000.00 | $1,600.00 | $18,000.00 | $1,800.00 | $ 20,000.00 | $2,000.00 |
| | 3 | $ 4,800.00 | $ 480.00 | $ 5,600.00 | $ 560.00 | $ 6,400.00 | $ 640.00 | $ 7,200.00 | $ 720.00 | $ 8,000.00 | $ 800.00 |
| | 4 | $ 4,200.00 | $ 420.00 | $ 4,900.00 | $ 490.00 | $ 5,600.00 | $ 560.00 | $ 6,300.00 | $ 630.00 | $ 7,000.00 | $ 700.00 |
| | 5 | $ 3,600.00 | $ 360.00 | $ 4,200.00 | $ 420.00 | $ 4,800.00 | $ 480.00 | $ 5,400.00 | $ 540.00 | $ 6,000.00 | $ 600.00 |
| | 6 | $ 3,000.00 | $ 300.00 | $ 3,500.00 | $ 350.00 | $ 4,000.00 | $ 400.00 | $ 4,500.00 | $ 450.00 | $ 5,000.00 | $ 500.00 |
| | 7 | $ 3,000.00 | $ 300.00 | $ 3,500.00 | $ 350.00 | $ 4,000.00 | $ 400.00 | $ 4,500.00 | $ 450.00 | $ 5,000.00 | $ 500.00 |
| | 8 | $ 1,800.00 | $ 180.00 | $ 2,100.00 | $ 210.00 | $ 2,400.00 | $ 240.00 | $ 2,700.00 | $ 270.00 | $ 3,000.00 | $ 300.00 |
| | 9 | $ 1,800.00 | $ 180.00 | $ 2,100.00 | $ 210.00 | $ 2,400.00 | $ 240.00 | $ 2,700.00 | $ 270.00. | $ 3,000.00 | $ 300.00 |
| | 10 | $ 1,800.00 | $ 180.00 | $ 2,100.00 | $ 210.00 | $ 2,400.00 | $ 240.00 | $ 2,700.00 | $ 270.00 | $ 3,000.00 | $ 300.00 |

Fig-10M

| | | | | | | | | | | | |
|---|---|---|---|---|---|---|---|---|---|---|---|
| Tournament buy-in value | | $ 5.00 | $ 10.00 | $ 20.00 | $ 30.00 | $ 40.00 | $ 50.00 | $ 60.00 | $ 70.00 | $ 80.00 | $ 90.00 | $ 100.00 |
| Prize pool | | $ 500.00 | $ 1,000.00 | $ 2,000.00 | $ 3,000.00 | $ 4,000.00 | $ 5,000.00 | $ 6,000.00 | $ 7,000.00 | $ 8,000.00 | $ 9,000.00 | $ 10,000.00 |
| # of Players in the tournament | | 100 | 100 | 100 | 100 | 100 | 100 | 100 | 100 | 100 | 100 | 100 |
| | 1 | $ 500 seat | $ 1000 seat | $1000 seat | $1000 seat | $1000 seat | $1000 seat | $1000 seat | $1000 seat | $1000 seat | $1000 seat | $1000 seat |
| | 2 | | | $1000 seat | $1000 seat | $1000 seat | $1000 seat | $1000 seat | $1000 seat | $1000 seat | $1000 seat | $1000 seat |
| | 3 | | | | $1000 seat | $1000 seat | $1000 seat | $1000 seat | $1000 seat | $1000 seat | $1000 seat | $1000 seat |
| | 4 | | | | | $1000 seat | $1000 seat | $1000 seat | $1000 seat | $1000 seat | $1000 seat | $1000 seat |
| | 5 | | | | | | $1000 seat | $1000 seat | $1000 seat | $1000 seat | $1000 seat | $1000 seat |
| | 6 | | | | | | | $1000 seat | $1000 seat | $1000 seat | $1000 seat | $1000 seat |
| | 7 | | | | | | | | $1000 seat | $1000 seat | $1000 seat | $1000 seat |
| | 8 | | | | | | | | | $1000 seat | $1000 seat | $1000 seat |
| | 9 | | | | | | | | | | $1000 seat | $1000 seat |
| | 10 | | | | | | | | | | | $1000 seat |

Fig-11A

| | |
|---|---|
| 1st Place | 55% |
| 2nd Place | 5% |
| 3rd Place | 5% |
| 4th Place | 5% |
| 5th Place | 5% |
| 6th Place | 5% |
| 7th Place | 5% |
| 8th Place | 5% |
| 9th Place | 5% |
| 10th Place | 5% |

| | | | The Amount that goes back to the original table in the satellite event | | The Amount that goes back to the original table in the satellite event |
|---|---|---|---|---|---|
| Tournament buy-in value | | $ 500.00 | | $ 1,000.00 | |
| Prize pool | | $500,000.00 | | 1,000,000.00 | |
| # of Players in the tournament | | 1,000 | | 1,000 | |
| | 1 | $275,000.00 | $25,000.00 | $550,000.00 | $50,000.00 |
| | 2 | $ 25,000.00 | $ 2,500.00 | $ 50,000.00 | $ 5,000.00 |
| | 3 | $ 25,000.00 | $ 2,500.00 | $ 50,000.00 | $ 5,000.00 |
| | 4 | $ 25,000.00 | $ 2,500.00 | $ 50,000.00 | $ 5,000.00 |
| | 5 | $ 25,000.00 | $ 2,500.00 | $ 50,000.00 | $ 5,000.00 |
| | 6 | $ 25,000.00 | $ 2,500.00 | $ 50,000.00 | $ 5,000.00 |
| | 7 | $ 25,000.00 | $ 2,500.00 | $ 50,000.00 | $ 5,000.00 |
| | 8 | $ 25,000.00 | $ 2,500.00 | $ 50,000.00 | $ 5,000.00 |
| | 9 | $ 25,000.00 | $ 2,500.00 | $ 50,000.00 | $ 5,000.00 |
| | 10 | $ 25,000.00 | $ 2,500.00 | $ 50,000.00 | $ 5,000.00 |

Fig-11E

POKER TOURNAMENT SYSTEM AND METHOD

TECHNICAL FIELD

The present invention generally relates to a poker tournament method and system. More specifically, the present invention relates to a poker tournament method and system that yields payouts to some players based on the performance of other competing players and not based on their individual success.

BACKGROUND OF THE INVENTION

Due, in large part, to expanded television coverage, poker has continued to increase in popularity. In the early 2000's, televised poker tournaments became popular fare and many of the competitors became celebrities. In particular, the traditional casino table game of Texas Hold 'Em became an internationally favored game. As the popularity and exposure has increased, poker tournaments have seen dramatic increases in the number of entrants and prize pools. Additionally, poker tournaments have become far more accessible in the U.S. as well as throughout the world due to the ability of individuals to participate in poker tournaments on-line. The advent of on-line tournaments has increased the number and availability of poker tournaments as the participants need not be located in a single place. Players can even participate in multiple tournaments on a single day or at the same time. This increased number of tournaments has allowed for more winners and thus more payouts to more players. In addition to monetary awards, players who win or place high in these on-line tournaments can also often receive automatic entry into another larger poker tournament.

Poker tournaments, both in real life and on-line via a computer, follow the same general method. Players register for the tournaments and when the tournament starting criteria is satisfied (generally a time, but can also be number of players) the tournament starts. Seats are assigned to players at random, and seat changes are not permitted before the tournament has started. Seats may be changed during the tournament, but only by the tournament management. Play then begins according to the rules applicable to the type of poker designated for that particular tournament.

Regardless of the type of poker being played, poker tournaments are typically played in a survival mode format, with play continuing until a target number of players is eliminated. Players typically continue play of the game until one player has all of the chips, which can require multiple sessions spanning many days. Poker tournaments can therefore become physically taxing events. When a single table is achieved in the final session, the players compete against each other, being eliminated one-at-a-time, until a single player remains standing. If there are nine players at the final table, for example, they may begin with nominal chip totals ranging from $1 to millions of dollars when beginning the final session. The first player eliminated (by losing all of their chips) would be the ninth place finisher (with nine players beginning the final table session). The second player eliminated would be the eight place finisher and so on until only the winner remained. Different awards are usually given to each place of finish and sometimes even to a limited number of players not making the final table (e.g., the 10th through 18th place finishers) depending upon the number of players who entered the tournament.

There are many different types of poker games and the forms of compensation to the winner and other players are usually based on the player's performance. However, the interest of the eliminated players typically decreases after they have exited the tournament. It would therefore be desirable to provide a poker tournament format that maintains the interest of players that have been eliminated from the tournament by allowing them to still earn a payout despite no longer competing in the tournament. It would also be desirable to provide a tournament that compensates more players.

SUMMARY OF THE INVENTION

It is thus an advantage of the present invention to provide a poker tournament that maintains an increased level of interest for players in the outcome of the tournament after they have been eliminated.

It is still another advantage of the present invention to provide a poker tournament that allows players who have already exited the tournament to earn rewards based on the performance of other competing players.

It is yet another advantage of the present invention to provide a poker tournament that allows players to enter a small poker tournament where the total combined entry fees of the players covers the cost of the entry fee for a larger tournament and the winner of the tournament earns a seat in the larger tournament with the losing payers having a stake in the performance of the winner at that larger tournament.

It is a further advantage of the present invention to provide a poker tournament that provides compensation to more participants, which encourages players to enter. It is still a further advantage of the present invention to provide a poker tournament where smaller tournaments within the larger tournament are set up and compensates players based on their advancement from one table to a next.

In accordance with the above and the other advantages of the present invention, a poker style card game tournament system and method is provided. The poker style tournament includes providing an original table at which a plurality of players can compete in the designated poker style card game. An entry fee for participating in the tournament is predetermined for each player. The type of poker style card game that the players would participate in is also predetermined. Additionally, an event outcome for determining a winner from amongst the plurality of players is determined in advance. The tournament provides a forum, such as a website, that allows each of the plurality of players to compete against one another in the predetermined poker style card game. The tournament identifies at least one point-leader from the plurality of players based on the satisfaction of the event outcome. At least one player that competed against at least one point-leader at the original table is designated as a stakeholder. The point-leader is advanced from the original table to one or more additional tables. Based on the performance of the point-leader at the one or more additional tables, the point-leader is compensated. Further, at least one stakeholder is also rewarded based on the performance of the point-leader at one or more additional tables. The number of point-leaders and stakeholders is determined by the administrator who oversees the tournament.

Other advantages of the present invention will be readily appreciated, as the same becomes better understood by reference to the following detailed description when considered in connection with the accompanying drawings.

BRIEF DESCRIPTION OF THE DRAWINGS

FIG. 3A is a table depicting an exemplary buy-in chart for a poker system and method in accordance with a preferred embodiment of the present invention;

FIG. 3C is a table depicting an exemplary payout structure for the poker system and method of FIG. 3B;

FIG. 4A is a table depicting an exemplary buy-in chart for a poker system and method in accordance with one embodiment of the present invention;

FIG. 4B is a graphic chart illustrating an exemplary payout structure for the poker system and method of FIG. 4A;

FIG. 8A is a table depicting an exemplary buy-in chart for a poker system and method in accordance with yet another embodiment of the present invention;

FIG. 8B is a graphic chart illustrating an exemplary payout structure the payout for the poker system and method of FIG. 8A;

FIG. 9 is a table illustrating an exemplary payout structure for a poker system and method in accordance with a preferred embodiment of the present invention;

FIG. 10B is a table illustrating an exemplary payout structure for the poker system and method of FIG. 10A;

FIG. 10M is a table illustrating an exemplary payout structure for the poker system and method of FIGS. 10A-10L;

FIG. 11A is a table illustrating an exemplary buy-in structure for a poker system and method in accordance with a preferred embodiment of the present invention;

FIG. 11E is table illustrating an exemplary payout structure for the poker system and method of FIGS. 11A through 11D.

DETAILED DESCRIPTION OF THE PREFERRED EMBODIMENT

The present invention relates to a poker tournament system and method. The preferred type of poker style game to be utilized in connection with the present invention is Texas Hold 'Em (either limit or no-limit). However, it will be understood that the present poker tournament system and method can be utilized in connection with virtually any of the different styles or types of poker, including Omaha, Omaha Hi-Lo, Seven Card Stud, Seven Card Hi-Lo; HORSE, and RAZZ. Obviously, the present invention may also be employed in connection with a variety of other poker type or style card games not listed and can alternatively be employed with other card games. It will additionally be understood that the present invention can also be utilized in connection with free rolls as well as invitationals.

Figure 1:
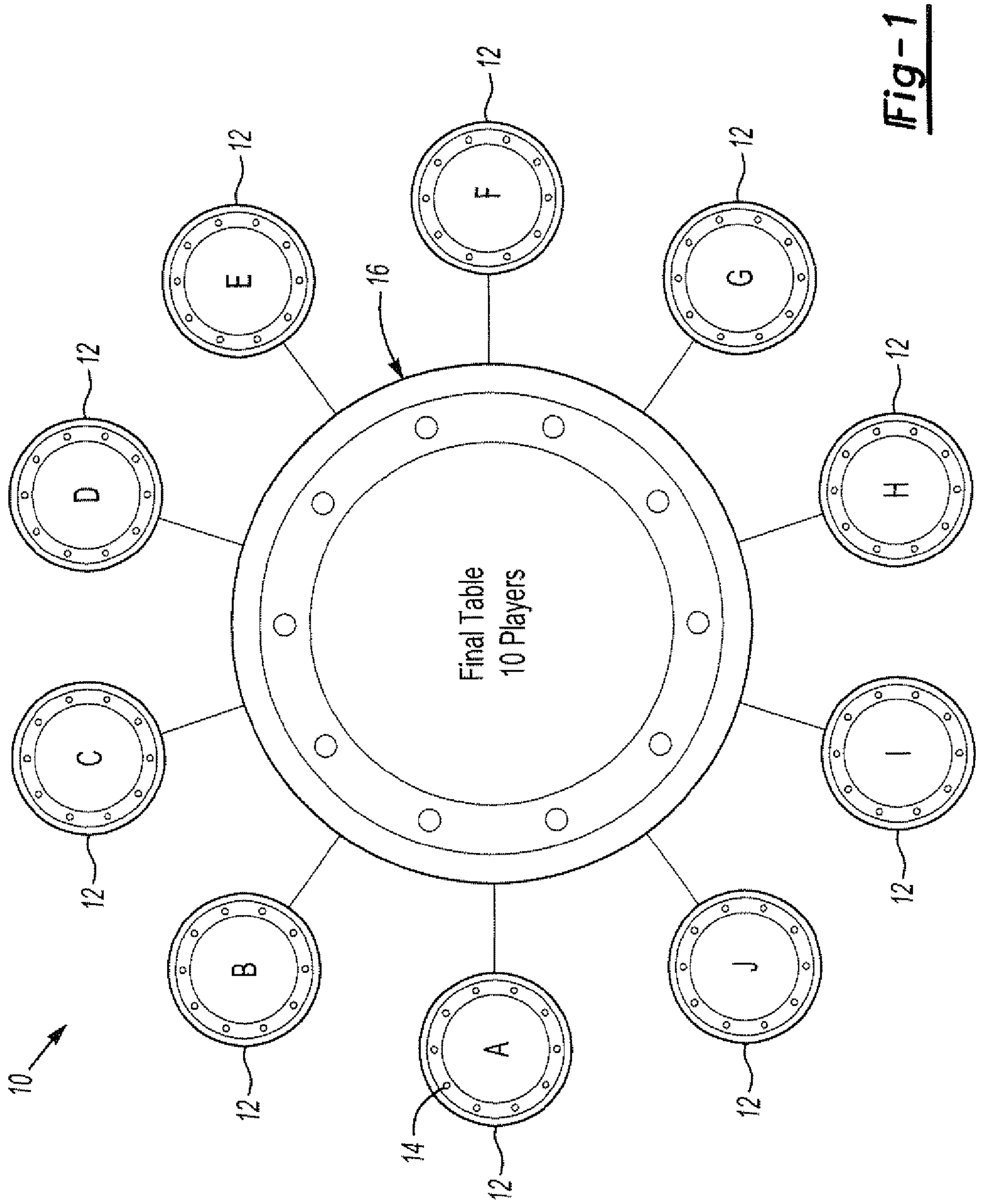
FIG. 1 is a schematic illustration of a poker system and method in accordance with a preferred embodiment of the present invention.
Figure 2:
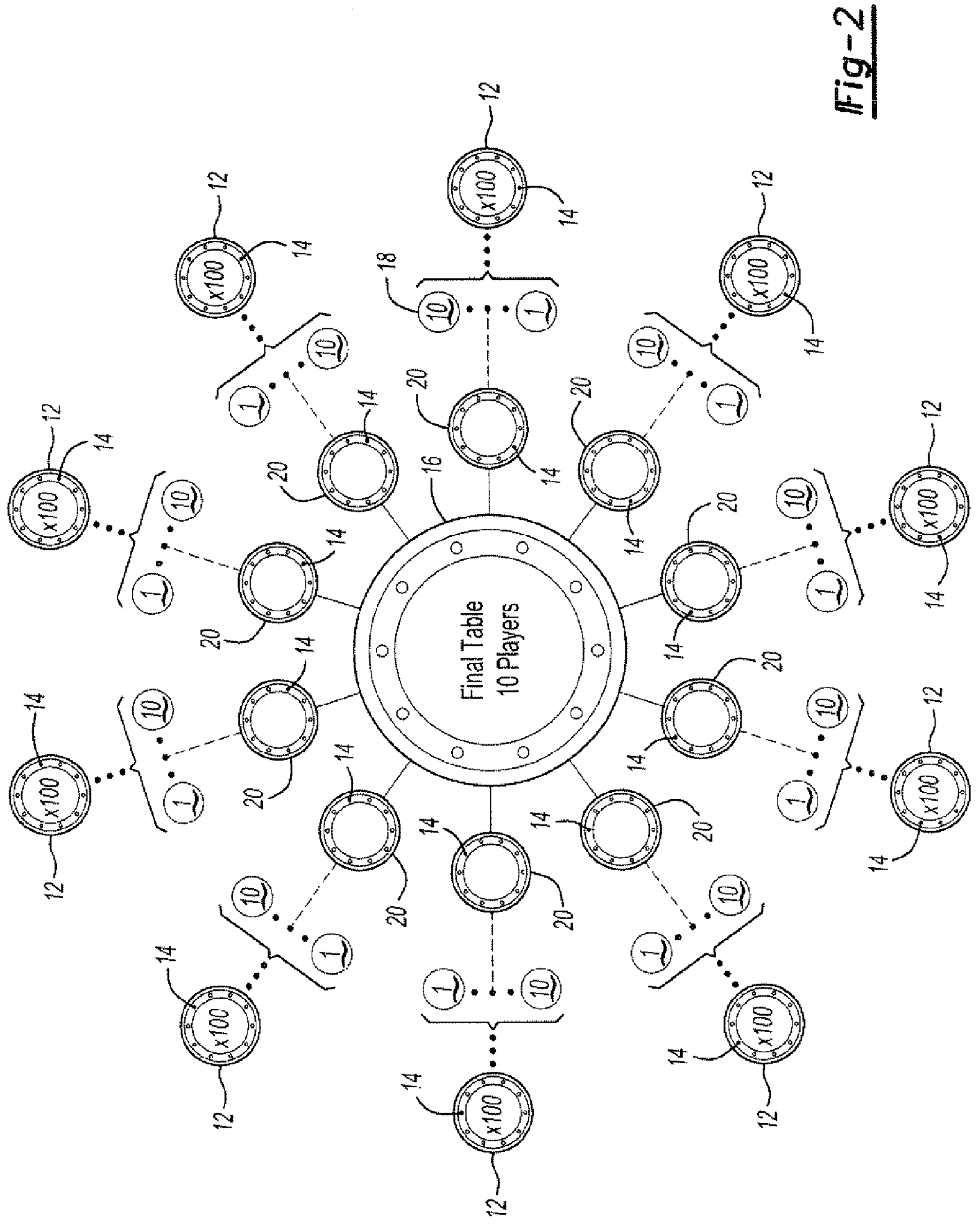
FIG. 2 is a schematic illustration of a poker system and method in accordance with another preferred embodiment of the present invention.

Referring to FIGS. 1 and 2, a poker tournament system and method is generally designated by reference number 10. The poker tournament system is preferably operated over the Internet and is accessible through an individual website, such that the participants can play from any location and the participants need not be at the same location when competing. It will be understood that the poker tournament system and method can be employed where some of the participants participate over the Internet and some are physically present at a particular location. Moreover, the poker tournament and system 10 is preferably operated by an organizer or administrator who operates the website that allows access by players.

In accordance with the present invention, the poker tournament and system 10 consists of a plurality of original or initial tables 12 each having a plurality of individual players 14. The original tables are the location where the players sit or are placed when the tournament begins. In accordance with a preferred embodiment, each original table 12 has ten individual players 14 to begin play. It will be understood that more or less players may be located at each original table 12. Each of the individual players 14 make a predetermined monetary payment to enter the tournament. The organizer of the tournament provides a payment vehicle, such as on a website, to facilitate payment of the entry fee by the players, such as by credit card, debit card or the like. It will be understood that the term original table can be used to refer to a table that is at an earlier phase than a later table and from which a player advances.

Upon entry, the players 14 are assigned a plurality of chips that represent a predetermined amount. For convenience, the amount of the entry fee preferably matches the amount of the plurality of chips assigned to each player. However, the amounts can differ and may have no correlation to the entry fee. Also, each player 14 preferably begins play at their original table 12 with the chips totaling the same amount as the other players. However, it will be understood that the chip amounts assigned to each player may differ depending upon how the tournament 10 is set up by the administrator.

The number of original tables 12 is not critical, but is predetermined in accordance with the operation of the disclosed system and method and is based on the size of the field for the tournament. The operation of the preferred tournament and system 10 is illustrated in exemplary FIG. 1. As shown in FIG. 1, in connection with one embodiment, the tournament is for one hundred (100) individual players 14 and consists of ten (10) original tables 12. It will be understood that a different number of tables may be employed, including only a single table. As shown, the original tables 12 are numbered A through J and each of the original tables 12A through 12J generates a winner. Each of the winners from each of original tables 12A through 12J advance to the final table 16 where the ten individual winners from each of the original tables 12A through 12J advance and compete to determine an overall winner.

It will be understood that there can be multiple levels of tables between the original table 12 and the final table 16 to allow for tournaments with more individual players. Additionally, while a tournament may consist of multiple levels, the tournament 10 of the present invention can be employed at a smaller subset of those levels within the larger tournament. Indeed, multiple smaller tournaments 10 can be included within the larger tournament. For example, in FIG. 2, the tournament may consist of many more levels. As shown in FIG. 2, each of the players 14 are housed at original tables 12. The players who advance from each of the original tables 12 then advance to the next level of tables, designated as the second phase tables 18 as discussed above, it will be appreciated that the second phase tables 18 can be considered original tables with respect to subsequent phases. Players who advance from the second phase tables 18 move forward to the third phase tables, designated by reference number 20, which consists of ten tables. The winners from the third phase tables 20 advance to the final table 16. It will be understood that the number of phases between the original tables 12 and the final table 16 can vary depending upon the number of players entered in the tournament. In accordance with the preferred embodiment where ten (10) players 14 are seated at each table, the number of tables increases by a multiple of ten as the phases move away from the final table 16. The ratio of tables in each phase will obviously vary as the number of players seated at each table varies.

In accordance with the present invention, according to one embodiment of the disclosed poker tournament system and method 10, players visit a website that provides them access to the system 10. Players 14 can access the website through a computer, such as a laptop or a mobile device, such as an I-Phone or the like. The website is preferably affiliated with a server owned or operated by the organizer of the tournament. Once at the website, the players 14 can create an account that allows the server to identify them. The players 14 can then enter the "satellite" poker tournament upon payment of a predetermined entry fee. Once a player's entry is accepted to participate in the "satellite" poker game, they are assigned to an original table 12 where they compete against nine other players to acquire points. Each of the players 14 at each of the original tables 12 compete in the satellite tournament. Based on the outcome of play at each table, the players 14 are assigned points. Depending upon the type of poker game being played, the points are typically acquired or assigned based on the number of chips the players 14 has earned. At the conclusion of a predetermined event, such as time or a result, one player at each of the original tables 12 has acquired the most points. The player 14 at each table with the most points is designated as the point-leader. In a preferred embodiment, the point-leader is the first place finisher. In accordance with a preferred embodiment, the type of poker game played is Texas Hold 'Em and the point-leader is the player who has gathered the chips from all the remaining players. The losing players (or players of each group that are not point-leaders) are designated as stakeholders of the point-leader of their respective original table 12. In other words, once a point-leader is determined at original table 12A, the players who competed against the point-leader at that table, are stakeholders in that point-leader. The point-leaders of each of the other tables 12B through 12J each have associated stakeholders.

In accordance with another embodiment, a point-leader can be determined or identified at each phase or level so that there can be multiple different point-leaders and stakeholders depending upon the level. Indeed, a person could be both a point-leader and a stakeholder. This allows more opportunities for more players to share in the prize pool of the tournament they entered or in a subsequent tournament in which a point-leader competes.

Once the point-leaders from each of the original tables 12A through 12J have been determined, they advance ultimately to the final table 16 whether directly or through various phases. These point-leaders compete against each other to determine a single winner as well as the other places—two (2) through ten (10). At the final table 16, the players 14 preferably start with the same amount of chips, which amount can carry forward from prior tables or may be reset. Alternatively, the players 14 may start with an unequal amount of chips based on the outcome of prior tables. Based on the outcome of the final table 16, the stakeholders of each respective point-leader earn a portion of the winnings of their group's point-leader. In other words, upon paying the entry fee, the stakeholders are invested in the ultimate point-leader of their group (to the extent that individual is not themselves the point-leader) upon losing to the point-leader in the satellite game. Again, the point-leader is preferably the player that finished first at their table. Moreover, as set forth below, there can be multi point-leaders. Moreover, in accordance with still another embodiment, the tournament 10 can be set up such that point leaders and stake holders are identified at each level within a larger tournament. There would thus be one or more tournaments within the larger tournament such that a point leader can receive winnings for placing at one level that is not the final table and shares those winnings with stakeholders that completed against that player at a prior level or table.

Figure 3B:
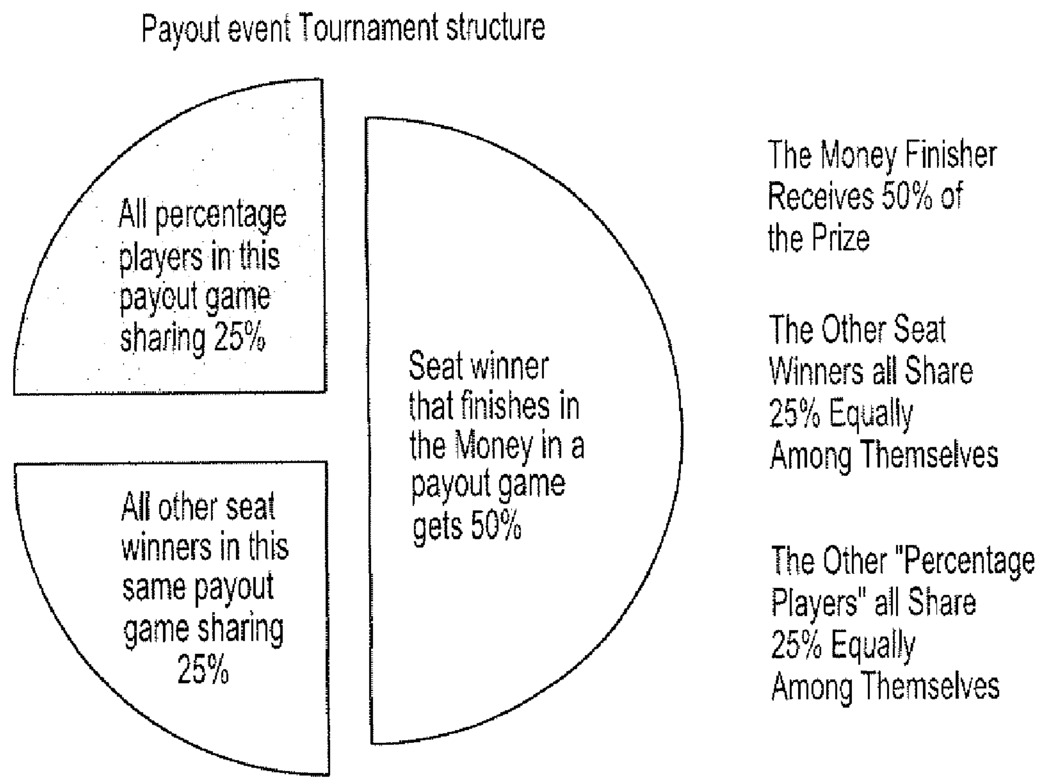
FIG. 3B is a graphic chart illustrating an exemplary payout structure for the poker system and method of FIG. 3A.

Referring now to FIGS. 3A through FIG. 3C, which illustrate one embodiment of the present invention for a one thousand (1000) person satellite format poker tournament that feeds to a larger payout game. FIG. 3A illustrates an exemplary buy-in table for a one thousand (1000) person satellite poker tournament. As shown in the first column, labeled "Buy-in to Satellite Game", the buy-in for the tournament 10 can vary with the table showing exemplary buy-ins options from $5.00 to $100.00 in various increments. The next column labeled "# of People in Tournament" demonstrates that for each of the buy-in options there are one thousand (1000) people in the tournament. The next column labeled "Money Generated From Satellite Games (Excluding Administration Fees)" depicts the amount of money generated by the tournament less administrative fees and varies based on the amount of the buy-in. In accordance with a preferred embodiment, the amount of the administrative fee is 10% of the buy-in. However, it will be understood that the administrative fee can clearly vary as determined by the administrator. So for a $5.00 buy-in, the administrative fee is $0.50, which results in a total entry fee for the player of $5.50. Similarly, for a $100.00 buy-in, the administrative fee is $10.00, which results in a total entry fee for the player of $110.00. As shown, according to the next column labeled "# of Seats to the Payout Game", the number of seats that are awarded to players increases as the buy-in increases from one seat for a $5.00 buy-in to 11 seats for a $100.00 buy-in. Thus, not only can players earn a seat to the "payout game", in this embodiment, they can also receive prize money.

The next column labeled "Prize Pool Left After Tickets Bought to Payout Game" denotes the amount of money available to be distributed to the players that have competed in the satellite tournament after the appropriate number of seats for the large "payout game" have been purchased. As shown, the amount for the prize pool increases as the buy-in amount increases. Similarly, the column labeled "Number of Players That Get Percentage of Winners at Payout Game", identifies the number of players that can share in the percentage of the winner's payouts after they advance to the "payout game" ("percentage players"). The last column labeled "Cost of a Seat at the Payout Event" provides the cost of the seat to the "payout game" for an individual if they were buying in to that event.

In accordance with this preferred embodiment, the people that advance to the "payout game" are designated as seat winners. So for a buy-in of $5.00, the player who finished first in the satellite tournament is the only seat winner. The seat winner can also be referred to as the point-leader. For a buy-in of $50.00 the players that finish in first through sixth places are each designated as seat winners or point-leaders. As shown in the table, a buy-in of $100.00, there are eleven stakeholders who are the players that finish in the top eleven places of the satellite tournament. The column that indicates the number of players that get a percentage of the point-leaders winnings designates the number of stakeholders that exist for the point-leaders. As shown, in the table, the number of stakeholders increases as the buy-in amount goes up. It will be understood that the ratio of the number of seat winners to the buy-in, as set forth in FIG. 3A, can vary. Similarly, the payout amount as well as the number of stakeholders can also vary as determined by the administrator.

FIG. 3B depicts a graph illustrating the payout structure for the stakeholders and the point-leaders once they have been determined or identified and based on the performance of the point-leaders in the "payout game". As shown, any seat winner that finishes in the money at the "payout game" keeps 50% of that prize money. To the extent there are other seat winners, they share equally 25% of the prize money. The percentage players that are not seat winners as set forth in the table of FIG. 3A, equally share the other 25% of the prize money. To the extent there is only one seat winner, the percentage players share equally the 50% of the prize money not kept by the seat winner that finishes in the money. If multiple seat winners from the tournament of the present invention finish in the money, they each share their winnings in accordance with FIG. 3B. It will be understood that the payout percentages to the seat winner in the money, the other seat winners, and the percentage players can vary as determined by the administrator. Again, the administrator can determine what constitutes in the money such that stake-holders can share in winnings awarded to another player who advances to a predetermined level, after previously competing against the stake-holders.

As shown, satellite tournaments in accordance with various embodiments, not only offer seats to a larger money event, but also pay out the top 10% of the field as well. The formula to determine the amount won is also unique. Specifically, every spot that a player moves up in terms of finish increases in value. This is compared to other tournaments where groups of players are lumped together and are paid the same value within a group. The buy-in for the $1,000,000.00 and higher plus pay-out games is 51,000 per seat. Everyone in the satellite tournament that ends up in the gray sanded area in FIG. 3C, gets a seat plus the amount associated with their placing in the satellite tournament. Everyone that finishes in the gray dotted area, gets a percentage of the winner's earnings in the gray sanded area that played with them in the satellite game that earned them a seat to the "million dollar pay out games." The percentages for the seat winners and percentage players are determined by their finish in the satellite event. Obviously, the percentage of players which place in the money can vary. The seat winners that play in the "Million dollar pay-out" games get 50% of whatever prize they win in the "pay-out" game with 50% going back to the players that finished with them in the satellite event; 25% going to the remaining seat winners and 25% going to the percentage players.

An exception to this rule in this embodiment is the $5.00 tournament winner, as there is only one seat given away; 50% goes back to the percentage players. All "percentage players" that played with a winner (money finisher) at the "Million dollar plus pay-out" games split 25% evenly among them of whatever prize the winner receives. All "Million dollar payout" games have 1000 people at a minimum entered with seats available to the "public" at a cost of $1,000.00 per seat. The money finishers that paid for their seats do not share the prize that they win with others. In accordance with a preferred embodiment, the "Million dollar games" times are announced once all seats are filled; with games preferably being played on Saturdays or Sundays. Seats to the million plus dollar games are not limited to this type of tournament, but also with what ever satellites are eligible based on seat costs.

FIG. 3C illustrates a table depicting the payout structure for the satellite tournament in accordance with this embodiment of the present invention. In accordance with this embodiment, there are 1000 players that enter this event and the payout structure rewards the top 10% of the players. Obviously, this percentage can vary. As shown in the table, the amount of prize money awarded to the players varies depending upon the buy-in amount as well as the place they finish in the satellite tournament. The seat winners are bolded in the table, and the number of seat winners increases with the amount of the buy-in. As shown, the seat winners earn a seat to the "payout game" as well as a monetary prize based on their finish. The number of percentage players, in the gray sanded area, also increases with the amount of the buy-in. Specifically, the table illustrates exemplary buy-in amounts of $5.00 to $100.00 and identifies the prize pool for each buy-in amount as well as the amount of prize money awarded to each player based on their finish for tournaments with the varying buy-in amounts. Additionally, everyone that qualifies as a percentage player becomes a stakeholder in the seat winners and get a percentage of the seat winners winnings in the "payout game".

In accordance with one example, a seat winner from a $100.00 tournament (finished 3rd in the satellite) advances to the "payout game", such as a million dollar event, and finishes in the money where they earn a payout of $100,000 ("seat winner money finisher"). In that event, the seat winner money finisher earns 50% of the payout or $50,000. In this embodiment, the ten (10) other seat winners that played with the seat winner money finisher at the original table 12, bolded in FIG. 3C, share equally 25% of the payout or $25,000. The eighty eight (88) percentage winners, gray sanded in FIG. 3C, that played in the satellite with the seat winner money finisher also share equally 25% of the payout or $25,000.

In accordance with another example, a seat winner from a $10.00 tournament (finished 2nd in the satellite) advances to the "payout game", such as a million dollar event, and finishes in the money where they earn a payout of $100,000 ("seat winner money finisher"). In that event, the seat winner money finisher earns 50% of the payout or $50,000. In this embodiment, the one other seat winner that played with the seat winner money finisher, gray dotted in FIG. 3C (which is broken down into three separate parts), wins 25% of the payout or $25,000 for himself. The sixteen (16) percentage winners, gray shaded in FIG. 3C, that played in the satellite with the seat winner money finisher also share equally 25% of the payout or $25,000.

In still another example, a seat winner from a $50.00 tournament (finished 4th in the satellite) advances to the "payout game", such as a million dollar event, and finishes in the money where they earn a payout of $100,000 ("seat winner money finisher"). In that event, the seat winner money finisher earns 50% of the payout or $50,000. In this embodiment, the five (5) other seat winners that played with the seat winner money finisher, bolded in FIG. 3C, share equally 25% of the payout or $25,000. The forty eight (48) percentage winners, gray shaded in FIG. 3C, that played in the satellite with the seat winner money finisher also share equally 25% of the payout or $25,000.

According to yet another example, a seat winner from a $10.00 tournament (finished 2nd in the satellite) advances to the "payout game", such as a million dollar event, and finishes in the money where they earn a payout of $10,000 ("seat winner money finisher"). In that event, the seat winner money finisher earns 50% of the payout or $5,000. In this embodiment, the one other seat winner that played with the seat winner money finisher, bolded in FIG. 3C, wins 25% of the payout or $2,500 for himself. The sixteen (16) percentage winners, gray shaded in FIG. 3C, that played in the satellite with the seat winner money finisher also share equally 25% of the payout or $2,500.

FIGS. 4A, 4B, 5A, 5B, 6A, 6B, 7A, 7B, 8A, 8B and 9 illustrate another embodiment of the present invention for a poker type tournament where up to ten (10) players compete against one another for a seat to a larger "payout game". FIG. 4A is a table illustrating an exemplary buy-in chart for a one table satellite tournament. The table illustrates exemplary buy-in amounts in various increments from $5.00 to $100.00. Again, the entry fee preferably adds 10% on the buy-in which goes directly to the administrator to cover expenses. As with all embodiments, this amount can vary. The table provides for ten (10) players in the second column, which yields an increasing prize pool as the buy-in amount increases. In this embodiment, only the point-leader or first place finisher in the satellite tournament earns a seat to the larger "payout game" tournament regardless of the buy-in amount. Also, as shown in the last column of the table in FIG. 4A, the seat winner can enter a larger entry fee "payout game" tournament as the buy-in for the satellite tournament increases. Put another way, the buy-in to the satellite tournament of this embodiment is determined by the cost of the seat to the "payout game" to which a seat can be won.

Like with the other embodiments, the seat winner in this embodiment can also be designated point-leader or seat winner with the other players at the table being stakeholders in the seat winner. FIG. 4B illustrates graphically the situation where the seat winner placed in the money at the "payout game". As shown, in this situation, the seat winner keeps 50% of the winnings from placing in the money in the "payout game", The various stakeholders share the remaining 50% based on how they finished in the satellite tournament. For example, the 2nd, 3rd, 4th, and 5th place finishers each receive 10% of the 50% of the seat winner's earnings from the "payout game". The 6th through 10th place finishers each receive 2% of the 50% of the seat winner's earnings from the "payout game".

Figures 5A, 5B:
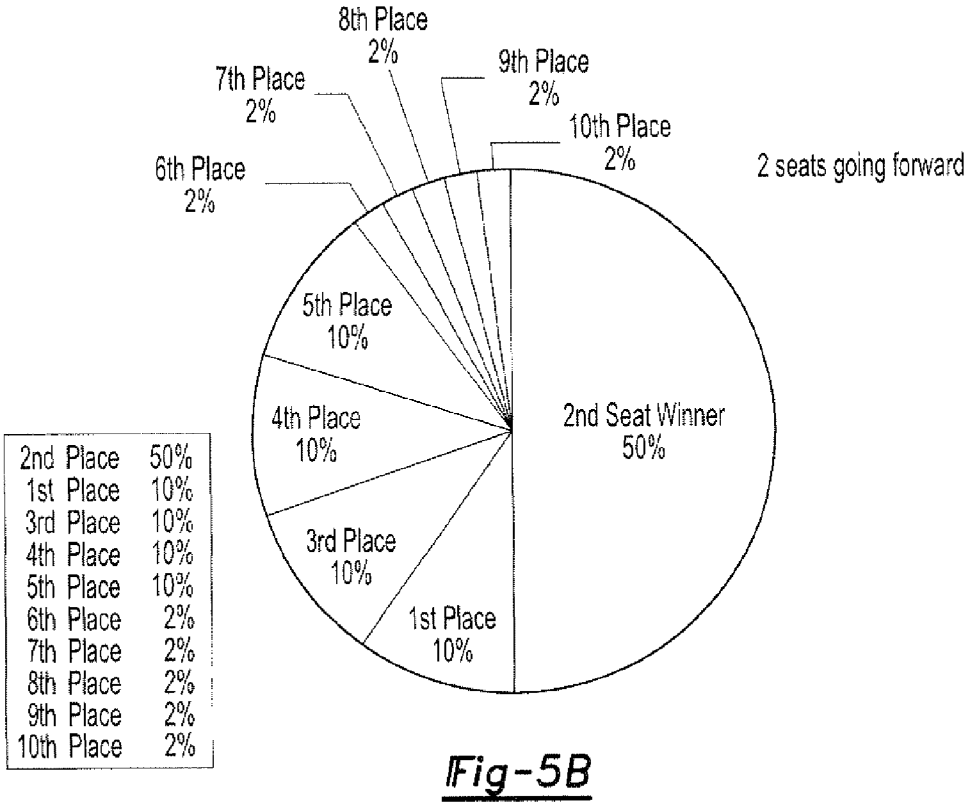
FIG. 5A is a table depicting an exemplary buy-in chart for a poker system and method in accordance with another embodiment of the present invention.
FIG. 5B is a graphic chart illustrating an exemplary payout structure for the poker system and method of FIG. 5A.

FIGS. 5A and 5B illustrate another embodiment of a table illustrating an exemplary buy-in chart for a one table satellite tournament. In this embodiment, the table of FIG. 5A illustrates exemplary buy-in amounts in various increments from $10.00 to $200.00. Again, the entry fee preferably adds 10% to the buy-in which goes directly to the administrator. The table provides for ten (10) players in the second column, which yields an increasing prize pool as the buy-in amount increases. In this embodiment, the top two finishers in the satellite tournament earn seats to the larger "payout game". The buy-in amount to the satellite tournament of this embodiment is determined by the cost of two seats to the "payout game".

FIG. 5B illustrates graphically the situation where at least one of the seat winners places in the money at the "payout game". As shown, in this event, the seat winner keeps 50% of the winnings from placing in the money in the "payout game". The various stakeholders share the remaining 50% based on how they finished in the satellite tournament. For example, the 2nd, 3rd, 4th, and 5th place finishers each receive 10% of the 50% of the seat winner's earnings from the "payout game". The 6th through 10th place finishers each receive 2% of the 50% of the seat winner's earnings from the "payout game". These same percentages would apply for each of the seat winners in the event they each finished in the money in the larger "payout game".

Figures 6A, 6B:
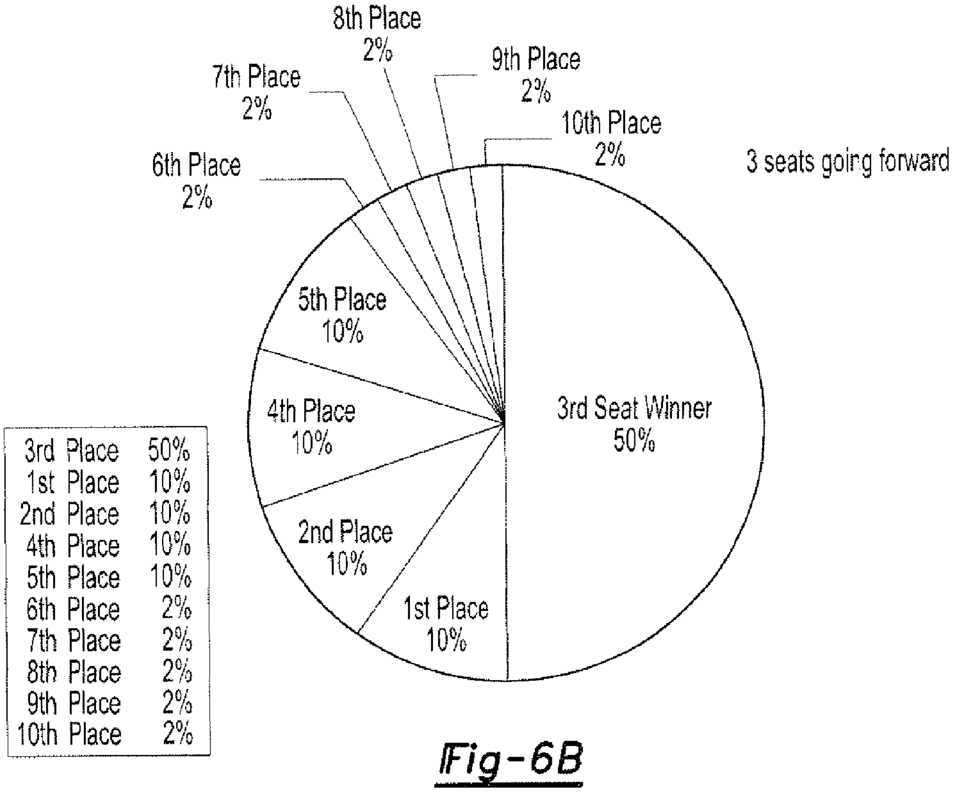
FIG. 6A is a table depicting an exemplary buy-in chart for a poker system and method in accordance with still another embodiment of the present invention.
FIG. 6B is a graphic chart illustrating an exemplary payout structure for the poker system and method of FIG. 6A.

FIGS. 6A and 6B illustrate another embodiment of a table illustrating an exemplary buy-in chart for a one table satellite tournament. In this embodiment, the table of FIG. 6A illustrates exemplary buy-in amounts in various increments from $15.00 to $300.00. In this embodiment, the top three finishers in the satellite tournament each earn seats to the larger "payout game". The buy-in amount to the satellite tournament of this embodiment is determined by the cost of three seats to the "payout game". The remainder of the table in 6A is the same as the table in FIGS. 4A and 5A and the same discussion of those tables applies here.

FIG. 6B illustrates graphically the situation where at least one of the seat winners placed in the money at the "payout game". As shown, in this event, the seat winner keeps 50% of the winnings from placing in the money in the "payout game". The various stakeholders share the remaining 50% based on how they finished in the satellite tournament. For example, the 2nd, 3rd, 4th, and 5th place finishers each receive 10% of the 50% of the seat winner's earnings from the "payout game". The 6th through 10th place finishers each receive 2% of the 50% of the seat winner's earnings from the "payout game". These same percentages would apply for each of the seat winners in the event some or all of them finished in the money in the larger "payout game".

Figures 7A, 7B:
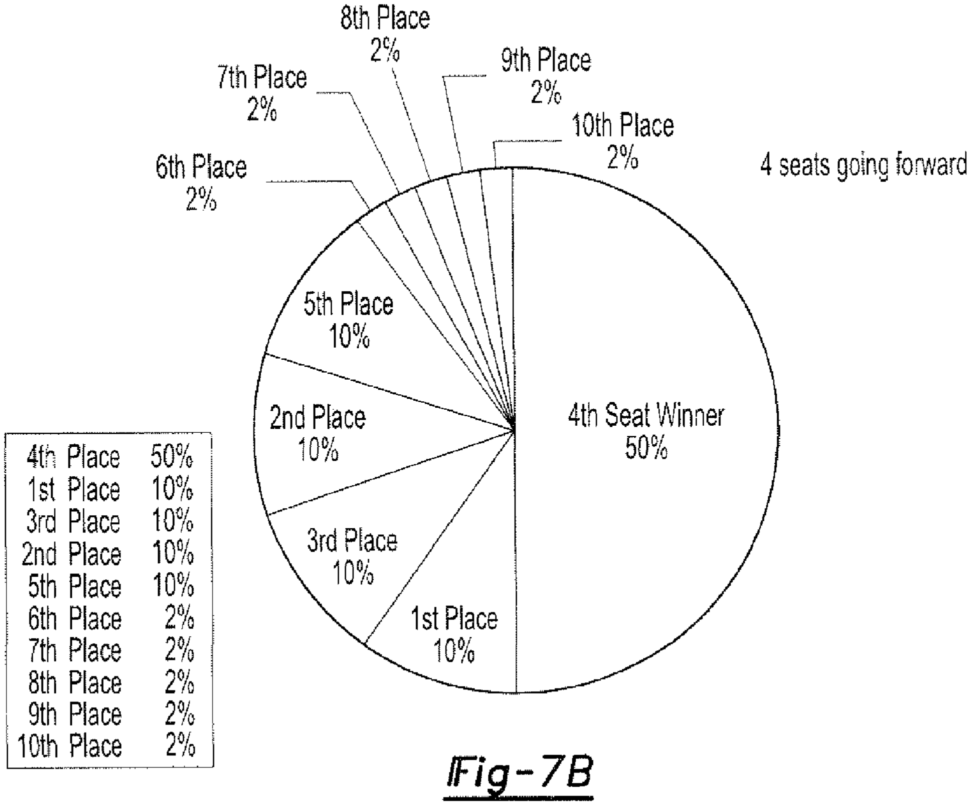
FIG. 7A is a table depicting an exemplary buy-in chart for a poker system and method in accordance with a further embodiment of the present invention.
FIG. 7B is a graphic chart illustrating an exemplary payout structure for the poker system and method of FIG. 7A.

FIGS. 7A and 7B illustrate another embodiment of a table illustrating an exemplary buy-in chart for a one table satellite tournament. In this embodiment, the table of FIG. 7A illustrates exemplary buy-in amounts in various increments from $20.00 to $400.00. In this embodiment, the top four finishers in the satellite tournament each earn seats to the larger "payout game". The buy-in amount to the satellite tournament of this embodiment is determined by the cost of four seats to the "payout game". The remainder of the table in 7A is the same as the table in FIGS. 4A and 5A and the same discussion of those tables applies here.

FIG. 7B illustrates graphically the situation where at least one of the seat winners placed in the money at the "payout game". As shown, in this event, the seat winner keeps 50% of the winnings from placing in the money in the "payout game". The various stakeholders share the remaining 50% based on how they finished in the satellite tournament. For example, the 2nd, 3rd, 4th, and 5th place finishers each receive 10% of the 50% of the seat winner's earnings from the "payout game". The 6th through 10th place finishers each receive 2% of the 50% of the seat winner's earnings from the "payout game". These same percentages would apply for each of the seat winners in the event they both finished in the money in the larger "payout game".

FIGS. 8A and 8B illustrate another embodiment of a table illustrating an exemplary buy-in chart for a one table satellite tournament. In this embodiment, the table of FIG. 8A illustrates exemplary buy-in amounts in various increments from $25.00 to $500.00. In this embodiment, the top three finishers in the satellite tournament each earn seats to the larger "payout game". The buy-in amount to the satellite tournament of this embodiment is determined by the cost of three seats to the "payout game". The remainder of the table in 8A is the same as the table in FIGS. 4A through 7A and the same discussion of those tables applies here.

FIG. 8B illustrates graphically the situation where at least one of the seat winners placed in the money at the "payout game". As shown, in this event, the seat winner keeps 50% of the winnings from placing in the money in the "payout game". The various stakeholders share the remaining 50% based on how they finished in the satellite tournament. For example, the 2nd, 3rd, 4th, and 5th place finishers each receive 10% of the 50% of the seat winner's earnings from the "payout game". The 6th through 10th place finishers each receive 2% of the 50% of the seat winner's earnings from the "payout game". These same percentages would apply for each of the seat winners in the event they both finished in the money in the larger payout event.

FIG. 9 is a table illustrating the percentage payout at the "payout game" for seat values from $50.00 to $1,000.00. FIG. 9 illustrates numerically the concepts of FIGS. 4B, 5B, 6B, 7B, and 8B. As shown, if a seat winner in one of the embodiments of FIGS. 4A, 5A, 6A, 7A, and 8A places in the money in a $50.00 buy-in "payout game", the stakeholders are compensated as set forth in accordance with the first column of FIG. 9. Similarly, if a seat winner in one of the embodiments of FIGS. 4A, 5A, 6A, 7A, and 8A places in the money in a $1,000.00 "payout game", the stakeholders are compensated, as set forth in accordance with the first column of FIG. 9.

Figure 10A:
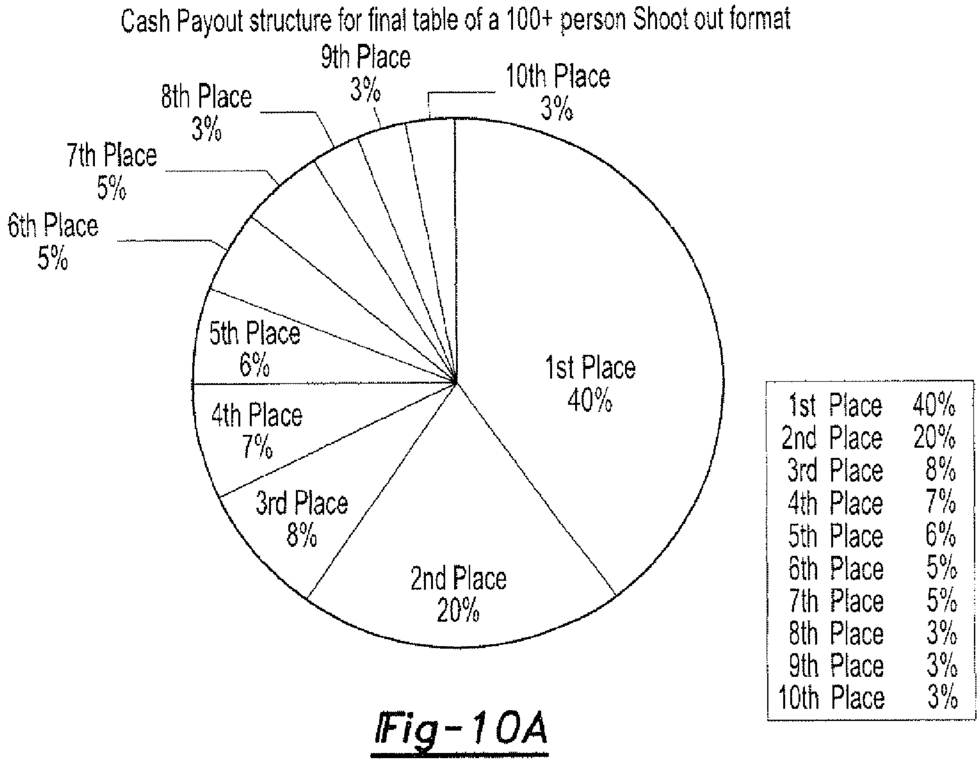
FIG. 10A is a graphic chart illustrating an exemplary payout structure for a poker system and method of the present invention.

FIGS. 10A through 10L illustrate an exemplary pay out structure for a final table of a one hundred (100) person tournament, such as a shoot out format for a no limit Texas Hold 'Em tournament. According to this exemplary embodiment, as shown schematically in FIG. 10A, the total prize structure is divided as follows: 1st place=40%; 2nd place=20%; 3rd place 8%; 4th place=7%; 5th place=6%; 6th place=5%; 7th place=5%; 8th place=3%; 9th place=3%; 10th place=3%. In this embodiment, the players 14 at the final table 16 share their prize with their original table 12. In other words, the players 14 that played with a player at an original table 12 that made it to the final table 16 all share in the finisher's prize. The structure of the final table pay out does not change with an increase in players to the tournament, as in accordance with this embodiment, the players at the final table are the only individuals that finish in the money. For example, the prize pool varies based on the number of players as well as the entry fee. As shown in FIG. 10B, a one thousand (1000) player tournament is shown with the entry fee varying from $5.00 to $100.00. The total prize pool for these examples varies from $5,000 to $100,000, respectively. Thus, while the percentage payouts do not change, the amounts vary for places first to tenth, as shown in the table of FIG. 10B. For a tournament with one thousand (1000) players and an entry fee of $50.00, the player who finishes in first place earns $20,000 and the players who finish in eighth, ninth, and tenth place each earn $1,500.

Figure 10C:
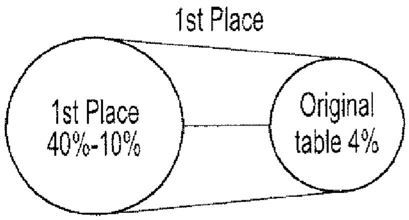
FIGS. 10C-10L are graphic charts illustrating individual exemplary payout structures for a poker system and method in accordance with a preferred embodiment of the present invention.
Figure 10D:
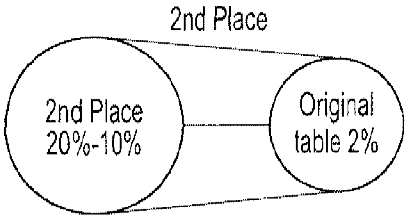
Figure 10E:
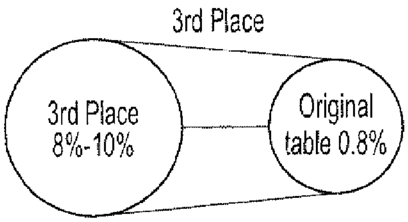
Figure 10F:
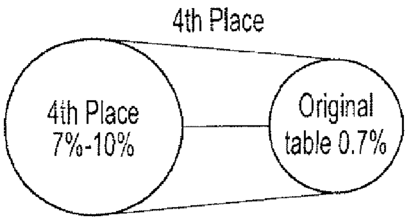
Figure 10G:
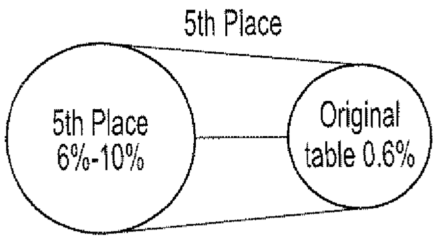
Figure 10H:
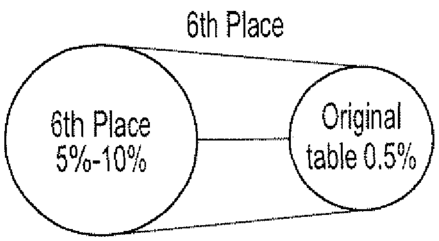
Figure 10I:
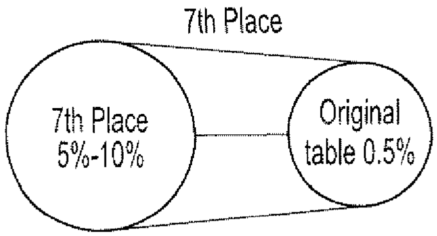
Figure 10J:
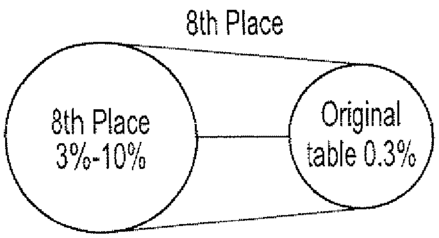
Figure 10K:
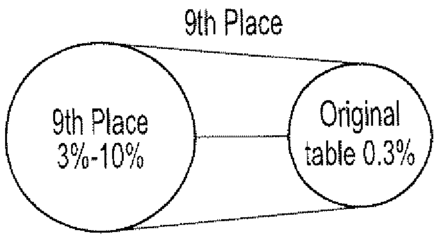
Figure 10L:
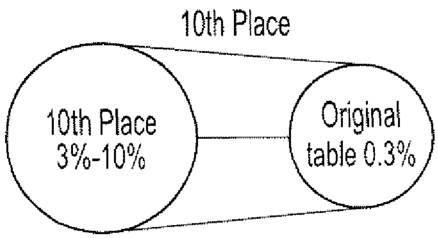

Additionally, in accordance with this embodiment, the players at the final table 16 share a portion of their winnings with the stakeholders from their original table 12. For example, in this embodiment, each player at the final table shares equally 10% of their winnings with the stakeholders. FIGS. 10C through 10L illustrate graphically how each of the players 14 at the final table 16 share a portion of their winnings with the stakeholders from their original table 12. Specifically, as shown in FIG. 10C, the first place finisher receives 40% of the total purse and shares 10% of their earnings with their stakeholders. In other words, the stakeholders split 4% of the total pursue amongst themselves. FIG. 10D illustrates that the second place finisher receives 20% of the total purse and shares 10% of the 20% second place purse or 2% of the total purse with their stakeholders. The third place finisher shares 10% of the 8% third place purse with stakeholders or 0.8% of the total purse who split that amount equally amongst themselves, as shown in FIG. 10E. The fourth place finisher shares 10% of the 7% fourth place purse with stakeholders or 0.7% of the total purse who split that amount equally amongst themselves, as shown in FIG. 10F. The fifth place finisher shares 10% of the 6% fifth place purse with stakeholders or 0.6% of the total purse who split that amount equally amongst themselves, as shown in FIG. 10G. The sixth and seventh place finishers each share 10% of their 5% share with stakeholders or 0.5% of the total purse who split that amount equally amongst themselves, as shown in FIGS. 10H and 10I. The eighth, ninth and tenth place finishers each share 10% of their 3% share with stakeholders or 0.3% of the total purse who split that amount equally amongst themselves, as shown in FIGS. 10J, 10K, and 10L.

It will be understood that the percentage given back to the original table stakeholders can vary as determined by the administrator. Once the tournament is complete, the stakeholders can be alerted to the fact that the point-leader has finished in the money in the "payout game" tournament and also informed as to the stakeholder's share of the winnings. The alert to the stakeholders can occur by test message, e-mail or by other suitable method so that they can promptly collect their winnings.

FIG. 10M shows in table format the portion of the proceeds that are shared with the stakeholders based one thousand (1000) players in the tournament with the entry amount varying. For example, for a one thousand (1000) person tournament with a $5.00 entry fee, the first to tenth place finishers from the original table 12 share the following amounts with their original table: 1st place (point-leader) $200.00; 2nd place (stakeholder)=$100.00; 3rd place (stakeholder) $40.00; fourth place (stakeholder)=$35.00; 5th place (stakeholder) =$30.00; 6th place (stakeholder)=$25.00; 7th place (stakeholder)=$25.00; 8th place (stakeholder)=$15.00; 9th place (stakeholder) $15.00; 10th place (stakeholder)=$15.00. By way of another example, for a one thousand (1000) person tournament with a $100 entry fee, the first to tenth place finishers from the original table 12 share the following amounts with their original table: 1st place (point-leader) =$4000.00; 2nd place (stakeholder)=$2000.00; 3rd place (stakeholder)=$800.00; fourth place (stakeholder)=$700.00; 5th place (stakeholder)=$600.00; 6th place (stakeholder) =$500.00; 7th place (stakeholder)=$500.00; 8th place (stakeholder)=$300.00; 9th place (stakeholder)=$300.00; 10th place (stakeholder)=$300.00. Percentages and amounts can vary. Also, the entry fees can be raised by 10% to account for administrative fees. This fee would go directly to administrator of the tournament and not make up part of purse.

FIGS. 11A to 11E illustrate another exemplary embodiment in accordance with the present invention. This embodiment relates to a one hundred (100) player poker tournament, such as a shoot out format for a no limit Texas Hold 'Em tournament, employing a satellite format where players participate from remote locations over a computer or a mobile device by accessing a website run by an administrator and maintained on a server or the like. In this embodiment, FIG. 11B graphically illustrates final table payout for this embodiment where the total prize structure is divided as follows: 1st place=55%; 2nd through 10th place=5%. The percentage amounts can obviously vary as set by the administrator. In this embodiment, the players 14 at the final table 16 also share their prize with their original table 12. In other words, the players 14 that played with a player at an original table 12 that made it to the final table 16 all share in the finisher's prize. The structure of the final table pay out does not change with an increase in the number of players to the tournament, as in accordance with this embodiment, the players at the final table are the only individuals that finish in the money.

Figure 11B:
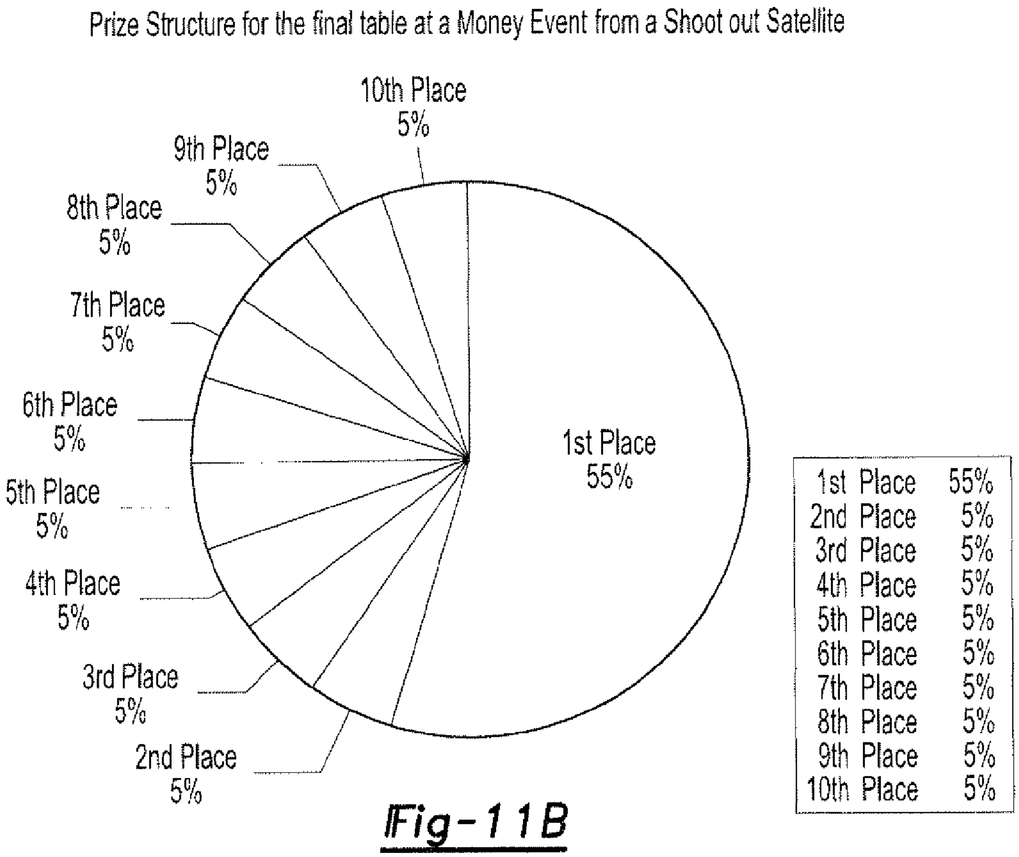
FIG. 11B is a graphic chart illustrating an exemplary payout structure for a poker system and method of FIG. 11A.

In this embodiment, the prize pool varies based on the number of players as well as the entry fee. As shown in FIG. 11A, a one hundred (100) player tournament is shown with the entry fee varying from $5.00 to $100.00. The total prize pool for these examples varies from $500 to $10,000. Thus, while the percentage payouts do not change, the amounts vary for places one to ten, as shown in the table of FIG. 11B. For a tournament with one hundred (100) players and an entry fee of $50.00, each of the first through fifth place finishers earn a $1,000 seat. In addition to winning the seat, each of the first, second, third, fourth and fifth place finishers can also win a cash payout. Again, it will be understood that the amounts may vary. Additionally, the number of players 14 can go up or down and with more players, the number of seats awarded to a larger "payout game" also increases.

Figure 11C:
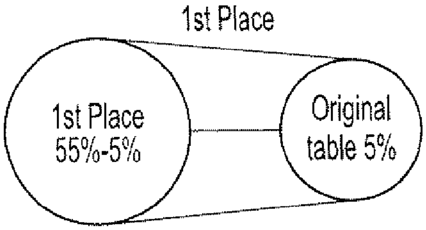
FIGS. 11C and 11D are graphic charts illustrating additional exemplary payout structures for the system and method of FIG. 11A.
Figure 11D:
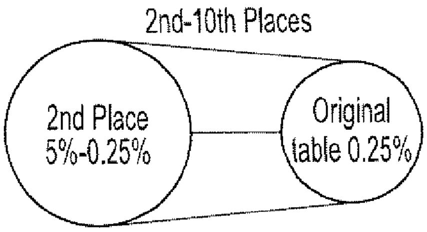

Additionally, in accordance with this embodiment, the players 14 at the final table 16 share a portion of their winnings with the stakeholders from their original table 12. For example, in this embodiment, each player 14 at the final table 16 shares 5% of their winnings with the stakeholders who divide it amongst themselves equally. FIGS. 11C through 11D illustrate graphically how each of the players 14 at the final table 16, in connection with another embodiment, share a portion of their winnings with the stakeholders from their original table 12. Specifically, as shown in FIG. 11C, the first place finisher receives 55% of the total purse and shares 5% of these earnings with stakeholders. In other words, the stakeholders share 5% of the total pursue equally amongst themselves. FIG. 11D illustrates that the second through tenth place finishers each receive 5% of the total purse and share 10% of these earnings with their stakeholders. In other words, the stakeholders share 0.5% of the total purse equally amongst themselves.

FIG. 11E shows in table format the portion of the proceeds that are shared with the stakeholders based on one thousand (1000) players in the tournament for buy-in amounts of $500.00 and $1,000.00. Obviously, this table can be readily adapted to accommodate various buy-in amounts. For example, for a one thousand (1000) person tournament with a $500.00 entry fee, the first to tenth place finishers from the original table 12 receives the following amounts: 1st place (point-leader)=$275,000 and shares equally amongst his original table the amount of $25,000. Thus, the nine stakeholders each get $2777.78. Similarly, the 2nd through 10th place finishers win $25,000 and share $2,500 equally among the other nine players or stakeholders. By way of another example for a one thousand (1000) person tournament with a $1000 entry fee, the first place finisher receives $550,000 and shares equally amongst his original table the amount of $50,000. Thus, the nine stakeholders each get $5555.55. Similarly, the 2nd through 10th place finishers win $50,000 and share $5,000 equally amongst the other nine players.

It will be understood that the described embodiments broadly relate to a tournament when some players, who finish in the money, share a portion of their winnings with other players with this event not being based on the other players' performance. It provides another opportunity for players entering the tournament to receive a payout besides their own performance. Thus, the various features and options described in connection with some embodiments can be applied to other embodiments. Additionally, the administrator can determine that accommodations and travel expenses are also awarded to the seat winners along with their seat to a larger payout game.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

What is claimed is:

1. A method of playing a poker style card game tournament, comprising:

providing an original table at which a plurality of players can compete in the poker style card game;

predetermining an entry fee for each of said plurality of players, a predetermined poker style card game in which the players will compete, and an event outcome for determining a winner from said plurality of players at said original table;

providing a mechanism that allows each of said plurality of players to pay said predetermined entry fee;

providing a forum that allows each of said plurality of players to compete against one another in the predetermined poker style card game at said original table;

identifying a point-leader from said plurality of players based on said event outcome;

advancing said point-leader from said original table to one or more additional tables;

compensating said point-leader based on their performance at said one or more additional tables;

identifying at least one stakeholder from said plurality of players, the at least one stakeholder having competed against said point leader; and rewarding said at least one stakeholder based on said performance of said point-leader at said one or more additional tables.

2. The method of claim 1, wherein said at least one stakeholder competed against said point-leader at said original table.

3. The method of claim 2, further comprising:

identifying a plurality of stakeholders who competed against said point-leader at said original table.

4. The method of claim 3 further comprising:

identifying a plurality of point-leaders determined by their placing at said original table.

5. The method of claim 4, further comprising:

awarding each of said plurality of point-leaders a seat to a larger payout game.

6. The method of claim 1 further comprising:

awarding said at least one point-leader a seat to a larger payout game.

7. The method of claim 1, wherein said event outcome is satisfied wherein one player eliminates all other players from said original table.

8. The method claim 1, wherein said at least one point-leader is the player that finished first at said original table.

9. The method of claim 1, further comprising:

notifying said at least one stakeholder that said at least one point-leader finished in the money and earned winnings; and informing said at least one stakeholder of their share of said at least one point-leader's earned winnings.

10. A method of playing a poker style card game tournament, comprising:

providing a first level consisting of a plurality of original tables;

providing a plurality of players at each of said plurality of original tables that compete each other in a series of rounds of poker style card games, assigning each of said plurality of players at said plurality of original tables a predetermined number of chips;

identifying one of said plurality of players at each of said plurality of original tables who won all of said predetermined number of chips as a point-leader;

identifying the others of said plurality of players at each of said plurality of original tables who lost all of their predetermined number of chips to one or more of said players as individual stakeholders;

identifying an overall winner of the tournament from all of said point-leaders;

paying at least said overall winner a predetermined amount for winning the tournament; and compensating at least one of said individual stakeholders who competed against said overall winner at a respective one of said plurality of original tables based on said predetermined amount paid to said overall winner.

11. The method of claim 10, further comprising:

paying a plurality of stakeholders who competed against said overall winner at said respective one of said plurality of original tables.

12. The method of claim 10, further comprising:

identifying a plurality of point-leaders based on their placing at said respective one of said original tables.

13. The method of claim 12, further comprising:

awarding each of said plurality of point-leaders a seat to a larger payout game.

14. The method of claim 10, further comprising:

awarding said at least one point-leader a seat to a larger payout game.

15. A poker style card game tournament method, comprising:

providing a plurality of players at an original table that compete against each other in a series of rounds of poker style card games;

assigning each of said plurality of players at said original table a predetermined number of chips;

number of chips from the others of said plurality of players in the series of rounds of poker style card games as a point-leader;

identifying at least one of the others of said plurality of players who lost all of the predetermined number of chips to one or more of said players in the series of rounds of poker style card games as a stakeholder;

advancing said point-leader to a payout game from the series of rounds of poker style card games;

compensating said stakeholder based on a performance of said point-leader at said payout game.

16. The poker style card game tournament method of claim 15, further comprising:

identifying a plurality of point-leaders based on their performance at said original table; and advancing said plurality of point-leaders to said payout game.

17. The poker style card game tournament method of claim 15, further comprising:

identifying a plurality of stakeholders who lost all of their predetermined number of chips to said at least one point-leader.

18. The poker style card game tournament method of claim 15, further comprising:

providing a plurality of original tables at which a plurality of players can each compete against each other in a series of rounds of poker style card games.

19. The poker style card game tournament method of claim 15, further comprising:

notifying said at least one stakeholder that said at least one point-leader finished in the money at said payout game and earned winnings; and informing said at least one stakeholder of their share of said at least one point-leader's earned winnings.

* * * * *

UNITED STATES PATENT AND TRADEMARK OFFICE

CERTIFICATE OF CORRECTION

PATENT NO. : 8,128,472 B1
APPLICATION NO. : 13/087410
DATED : March 6, 2012
INVENTOR(S) : Charles Clarence Darcy Lyons, Roger David Keen and Paul Michael Roper It is certified that error appears in the above-identified patent and that said Letters Patent is hereby corrected as shown below:

In the claims:

Column 16, Line 6, Claim 15: should read -- identifying one of said plurality of players who won all of said predetermined number of chips from the others of said plurality of players in the series of rounds of poker style card games as a point-leader; --

Signed and Sealed this
Seventh Day of August, 2012

David J. Kappos
*Director of the United States Patent and Trademark Office*